(12) United States Patent
Kambouris et al.

(10) Patent No.: US 6,858,309 B2
(45) Date of Patent: Feb. 22, 2005

(54) METHODS OF POLYMERIZATION

(75) Inventors: Peter Kambouris, Queensland (AU); Michael Whittaker, New South Wales (AU); Tom Davis, New South Wales (AU); Idriss Blakey, Queensland (AU); Gary M. Day, Queensland (AU)

(73) Assignee: Polymerat Pty. Ltd., Brisbane (AU)

( * ) Notice: Subject to any disclaimer, the term of this patent is extended or adjusted under 35 U.S.C. 154(b) by 164 days.

(21) Appl. No.: 10/109,777

(22) Filed: Mar. 28, 2002

(65) Prior Publication Data

US 2003/0088028 A1 May 8, 2003

(30) Foreign Application Priority Data

Mar. 28, 2001 (AU) ......................................... PR4048/01

(51) Int. Cl.[7] ............................................... B32B 9/04
(52) U.S. Cl. ...................... 428/447; 428/413; 427/496; 427/508; 427/384; 427/393.5; 427/536
(58) Field of Search ................................ 428/447, 413; 427/496, 508, 384, 393.5, 536, 223, 332

(56) References Cited

U.S. PATENT DOCUMENTS

| 4,267,202 A | | 5/1981 | Nakayama et al. | |
|---|---|---|---|---|
| 5,080,924 A | | 1/1992 | Kamel et al. | |
| 5,139,817 A | | 8/1992 | Abe et al. | |
| 5,789,487 A | | 8/1998 | Matyjaszewski et al. | |
| 5,922,161 A | * | 7/1999 | Wu et al. ................. | 156/272.6 |
| 6,001,894 A | | 12/1999 | Ottersbach et al. | |
| 6,310,149 B1 | | 10/2001 | Haddleton | |

FOREIGN PATENT DOCUMENTS

| CA | 2052783 | 2/1998 |
|---|---|---|
| CA | 2341387 | 3/2000 |
| CA | 2249955 | 4/2000 |
| WO | WO 97/47661 | 12/1997 |
| WO | WO 98/01480 | 1/1998 |
| WO | WO 98/31732 A | 7/1998 |
| WO | WO 02/50171 | 6/1999 |
| WO | WO 99/28352 | 6/1999 |
| WO | WO 00/12575 | 3/2000 |
| WO | WO 00/78740 | 12/2000 |
| WO | WO 01/62804 A | 8/2001 |

OTHER PUBLICATIONS

Angot, et al., "Living Radical Polymerization Immobilized on Wang Resins: Synthesis and Harvest of Narrow Polydipersity Poly(methacrylate)s," *Macromolecules* 34:768–774 (2001).

Darling, et al., "Living Polymerization: Rationale for Uniform Terminology," *J. Polym. Sci. Part A: Polym. Chem.* 38:1706–1708 (2000).

Ejaz, et al., "Controlled Grafting of a Wall–Defined Glycopolymer on a Solid Surfact by Surface–Initiated Atom Transfer Radical polymerization," *Macromolecules* 33:2870–2874 (2000).

Granel, et al., Controlled Radical Polymerization of Methacrylic Monomers in the Presence of a Bis(ortho–chelated) Arylnickel(II) Complex and Different Activated Alkyl Halides *Macromolecules* 29:8576–8582 (1996).

Hawker, et al., "Radical Crossover in Nitroxide Mediated 'Living' Free Radical Polymerizations," *J. Am. Chem. Soc.* 118:11467–11471 (1996).

Kato, et al., "Polymerization of Methyl Methacrylate with the Carbon Tetracloride/Dichlorotris–(triphenylphosphine)ruthenium(II)Methylaluminum Bis(2,6–di–tert–butylphenoxide)Initiating System: Possibility of Living Radial Polymerization," *Macromolecules* 28:1721–1723 (1995).

Mandal, et al., "Production of Hollow Polymeric Microspheres by Surface–Confined Living Radical Polymerization on Silica Templates," *Chem. Mater.* 12:3481–3487 (2000).

Pattern, et al., "Polymers with Very Low Polydispersities from Atom Transfer Radical Polymerization," *Science* 272:866–868 (1996).

Percec & Barboiu, 'Living' Radical Polymerization of Styrene Initiated by Arenesuljonyl Chlorides and $Cu^1(bpy)_nC1$ *Macromolecules* 28:7970–7972 (1995).

Wang & Matyjaszewski, "Controlled/'Living' Radical Polymerization. Atom Transfer Radical Polyerization in the Presence of Transition–Metal Complexes," *J. Am. Chem. Soc.* 117:5614–5615 (1995).

Copending U.S. patent application 10/052,907, filed Jan. 17, 2002.

Derwent Abstract Accession No. 96–502794, Class A96, and JP 8–259716 A.

Derwent Abstract Accession No. 89–367670, Class A35, and JP 1–275639 A.

* cited by examiner

*Primary Examiner*—Robert Dawson
*Assistant Examiner*—Christopher Keehan
(74) *Attorney, Agent, or Firm*—Howrey Simon Arnold and White LLP; Albert P. Halluin; Adam K. Whiting

(57) ABSTRACT

The present invention provides improved methods for conducting living/controlled polymerization on polymeric solid supports. The improved methods allow polymerization to occur directly from the non-functionalized surface of a bulk support. In addition, polymerization may be re-initiated to provide co-polymers. The disclosed methods may employ the non-nitroxide-based RAFT and ATRP control agents that allow controlled polymerization to proceed at relatively low temperatures (<80° C.). Furthermore, these improved methods may provide graft polymers with decreased levels of "in-growth" of the bulk solid support. The invention also provides substrate polymers, with improved properties for solid phase synthesis and diagnostic applications, which may be made by the disclosed methods.

107 Claims, 6 Drawing Sheets

US 6,858,309 B2

METHODS OF POLYMERIZATION

This application claims priority under 35 U.S.C. §119 from Australian provisional application PR4048/01 filed Mar. 28, 2001, which is hereby incorporated herein by reference.

FIELD OF THE INVENTION

The present invention relates generally to polymerization processes and more particularly to modifying the surfaces of solid supports to facilitate polymerization processes. The present invention is predicated in part on the use of radicals generated on functional and/or backbone portions of polymers forming part of a solid phase surface and/or subsurface to generate a substrate for initiation of polymerization. In a preferred embodiment, the polymerization is conducted in the presence of a control agent which induces a dynamic population of anchored growing and dormant polymeric chains each comprising two or more monomers. The polymerization conditions contemplated by the present invention include, therefore, inter alia living polymerization. Consequently, the present invention provides a means for generating a population of anchored polymer chains in a controlled manner. Polymers generated by this process include homopolymers and copolymers (comprising two or more monomers including ter-polymers) such as inter alia block, graft, tapered, cross-linked and branched polymers.

BACKGROUND OF THE INVENTION

Moderating the influence of a bulk material's surface chemistry, such as imparting hydrophilic nature to a hydrophobic but stable bulk material, is a technique central to many areas of research ranging from biotechnology to microelectronics. The ability to modify the nature of a surface with macromolecules has existed for some time. Methods developed allow the covalent surface attachment of pre-formed macromolecular systems, the grafting of solution initiated macromolecular chains to a suitably functionalized surface, and the surface-initiated polymerization of a variety of monomer formulations. All these methods have resulted in effective graft coating of the substrate with high grafting efficiency. However, they provide little control of the macromolecular properties (molecular weight, distribution and composition) of the polymer layer. Furthermore, as well as generating a polymer coating on the substrate, the process also results in the formation of non-bound polymer in solution, which can hinder isolation and purification of the coated substrate.

The control of polymer coatings on bulk solid-supports is key to improving the utility of combinatorial solid-phase synthesis, as well as other solid-phase applications. Solid-phase synthesis technologies are used to create large numbers of new chemical compositions across a wide range of chemical disciplines. For example, combinatorial chemical synthesis may be carried out on the solid phase to generate libraries of thousands of new chemical entities that may be evaluated as pharmaceutical lead compounds. One method for generating new useful supports for solid-phase synthesis is by grafting polymers to an underlying bulk solid support. The grafted polymers may be selected to have chemical functional groups, or other physical properties, that provide improved sites for solid-phase synthesis.

The limitations cited above have provided impetus for the development of surface-confined methods of grafting substrates of interest with predetermined macromolecular composition and architecture, employing the spectrum of commercially-available monomers susceptible to standard free radical chemistry. More recently, methods to achieve such have been reported utilizing "living"/controlled free radical polymerization (see e.g. Kato, et al., *Macromolecules* 28: 1721 (1995); Wang & Matyjaszewski, *J. Am. Chem. Soc.* 117: 5614 (1995); Pattern et al., *Science* 272: 866 (1996); Percec & Barboiu *Macromolecules* 28: 7970 (1995); Granel et al., *Macromolecules* 29: 8576 (1996); Hawker et al., *J. Am. Chem. Soc.* 118: 11467 (1996); Ejaz et al, *Macromolecules* 33: 2870 (2000); Mandal et al., *Chem. Mater.* 12: 3481 (2000); and Angot et al, *Macromolecules* 34: 768 (2001)). As these methods work by controlling the growth of polymer chains, the tethered chain ends are active, thus the desired polymer molecular weight and composition can be achieved by varying the nature of the monomer feed and time of polymerization. The continuous approach that these controlled methods of performing free radical polymerization allows, does not result in the generation of steric barriers imposed by crowding of the growing chains at the surface, which hinders the diffusion of chain ends to the monomer interface for further propagation of the bound macromolecules. The ability of the living free radical process to achieve these desired effects is based on the dynamic equilibrium between dormant and active chain ends. The terminology "living"/controlled radical polymerization is discussed in Darling et al., *J. Polym. Sci. Part A: Polym. Chem.* 38: 1706 (2000). The general features of such a polymerization are:

(1) the main chain carrier is a carbon centered radical;

(2) the control over the reaction is exerted by a reversible capping mechanism so that there is an equilibrium between dormant and active chains; this has the effect of reducing the overall radical concentration, thereby suppressing radical-radical termination events; in reversible-addition-fragmentation transfer (RAFT) polymerizations, this is achieved by a dithioester or related compound; in atom transfer radical polymerization (ATRP), this is achieved by a halogen atom and in nitroxide-mediated polymerizations (NMP) it is achieved with a nitroxide molecule;

(3) the molecular weight of the polymer grows in a linear fashion with time/conversion;

(4) "living" polymers are distinguished from "dead" polymers by having the ability to grow whenever addition monomer is supplied; and (5) block copolymers can be prepared by sequential monomer addition.

These general features of the state of the art of living/controlled polymerizations may be found in several recent patent publications. WO 98/01480 (Matyjaszewski et al.) describes a solution-phase method of controlled polymerization using Atom Transfer Radical Polymerization (ATRP). The disclosed method uses control agents comprising transition metal-ligand complexes. WO 97/47661 (corresponds to U.S. Pat. No. 6,310,149 B1, Haddleton) discloses additional metal-ligand complexes that are useful as ATRP control agents in solution phase controlled polymerization reactions. WO 99/28352 (Haddleton et al) discloses solid silica supports chemically modified with ligands that can be used to immobilize transition metals capable of acting as control agents for controlled polymerization reactions of the type described in WO 98/01480 and WO 97/47661. Canadian Patent application 2,341,387 (Bottcher et al.) discloses the use of a "living"/controlled polymerization method to produce defined layers of polymers on a solid surface. The disclosed "living"/controlled polymerization method requires chemically modifying the solid surface with a compound of the general formula A-L-I, where A represents an active group, I is an ATRP initiating group, and L is a linkage between them. Canadian Patent application 2,249,955 (Guillet et al.) discloses a method of graft polymerization on backbone polymers using stable nitroxide-based free-radical generating compounds. The disclosed method is limited to stable free radicals that can exist in solution for at least 24 hours without recombining with one another to any substantial extent. Moreover, the nitroxide-based free radical compounds disclosed by Canadian Patent application 2,249,955 require high temperatures (i.e. >110° C.) to achieve controlled polymerization. High temperatures during polymerization have the disadvantage of increasing the production of unbound polymerization in solution as well as causing increased "in-growth" of the graft polymer into the bulk solid support.

Notwithstanding the partial successes of previous "living"/controlled polymerization processes in the development of a range of polymers, these processes exhibit the disadvantages of requiring a multi-step approach to the attachment of the control agent to the substrate and/or high-temperature nitroxide-based control agents. Consequently, the surface of the bulk solid support must be functionalized prior to polymerization and/or treated to high temperatures that result in non-surface-bound polymers as well as undesirable polymer graft in-growth.

The in-growth, or penetration of grafts into the bulk solid support during the polymerization process is a major limitation of state of the art solid phase grafting techniques. Ideally, polymerization of grafts occurs on the outer most surface of a solid support (i.e. with little or no penetration into the bulk solid) so that functional groups on the graft have maximum accessibility to the surrounding solvent environment. The in-growth of polymer grafts results in poor accessibility to the solvent environment. Furthermore, this lack of accessibility is exacerbated by the solvent swelling that most polymers undergo during the course of a solid-phase synthesis protocol.

Consequently, the use of the polymer grafts as sites for solid-phase synthesis results in large amounts of impurities. These impurities must be separated from the desired products upon cleavage from the support resulting in lower solid phase synthesis yields and increased costs. Additionally, where solid phase synthesis is used in the context of high-throughput screening applications (e.g. solid-phase combinatorial synthesis methods), the presence of even small amounts of impurities may create a false positive "hit" that misleads researchers, resulting in lost time, effort and money.

State of the art methods of living/controlled polymerization that generate polymer grafts on solid supports do not allow one to control the depth of penetration (i.e. in-growth) of grafts. Consequently, substrate polymers for solid-phase synthesis, made using state of the art methods, have unpredictable surface properties. Specifically, the transition (i.e. boundary layer) between the bulk polymer of the solid support and the polymer of the graft may vary considerably between different preparations. As described above, these differences may greatly affect the usefulness of a substrate polymer in solid-phase synthesis, or any other solid-phase application that requires consistent surface characteristics.

In accordance with the present invention, the inventors have developed more efficacious methods for controlled polymerization on solid supports which facilitate the production of a range of polymers grafted to a solid support. These improved methods allow polymerization to occur directly from the non-functionalized surface of the bulk support. In addition, these methods may employ the non-nitroxide-based RAFT and ATRP control agents that allow controlled polymerization to proceed at relatively low temperatures (<80° C.). Significantly, these improved methods may be controlled so as to provide reproducibly thin layers of graft polymers with decreased levels of "in-growth" of the bulk solid support.

SUMMARY OF THE INVENTION

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

One aspect of the present invention provides a method for generating a surface or sub-surface region of a polymer forming at least part of a non-functionalized solid support for use in a living polymerization process, said method comprising subjecting said surface and/or sub-surface region of said polymer to radical-forming means for a time and under conditions sufficient to generate radicals wherein said radicals may be capped by a control agent for subsequent use or may participate in a grafting reaction of a monomer or its precursor.

The substrate polymer surfaces modified with control agents generated by the invention are useful for graft polymerization processes. In one embodiment the method for generating these substrate polymers comprises: providing a substrate polymer with a non-functionalized surface; subjecting the substrate polymer to a radical-forming agent; and contacting the substrate polymer with a solution comprising solvent and a control agent under conditions wherein the temperature is less than 80° C. The resulting surface of the substrate polymer is modified with the control agent.

In preferred embodiments, this method may be conducted at temperatures less than 60° C. and preferably less than 45° C. in order to prevent heat damage to molded plastic substrates. Also in preferred embodiments of this method, the control agents may be selected from the group of control agent compounds consisting of: RAFT agents, ATRP agents and nitroxide-radical based control agents.

Another preferred embodiment provides a method for generating a substrate polymer with a plurality of surface regions modified with control agents useful for graft polymerization. This method comprises: providing a substrate polymer with a non-functionalized surface; subjecting a first region of the surface of the substrate polymer to a radical-forming agent; and contacting the substrate polymer with a solution comprising solvent and a first control agent under conditions wherein the temperature is less than 80° C. The method further comprises: subjecting at least a second region of the surface of the substrate polymer to a radical-forming agent; and contacting the substrate polymer with at least a second solution comprising solvent and a second control agent under conditions wherein the temperature is less than 80° C. The above combination of steps results in the first and at least second regions of the surface of the solid support are modified with the first and second control agents. In a particularly preferred embodiment of this method, at least two regions of the substrate polymer are modified with different control agents. However, the method need not be limited to only two control agents. In another preferred embodiment of this method, the different control agents at the at least two regions on the surface of the substrate polymer utilize chemically orthogonal conditions for subsequent living/controlled polymerization of graft polymers.

In another embodiment, physical stress means may be selectively applied to a substrate polymer to generate a plurality of surface regions useful for graft polymerization. In this embodiment the method comprises: providing a substrate polymer comprising a surface; subjecting a first region of the surface of the substrate polymer to a physical stress means; subjecting the first region of the surface of the substrate polymer to a radical-forming means; and contacting the substrate polymer with a solution comprising solvent and a first control agent. The method further comprises: subjecting at least a second region of the surface of the substrate polymer to a physical stress means; subjecting the at least second region of the surface of the substrate polymer to a radical-forming agent; and contacting the substrate polymer with at least a second solution comprising solvent and a second control agent. The method thereby results in a first and at least a second region of the surface of the substrate polymer modified with the first and second control agents. In a particularly preferred embodiment of this method, at least two regions of the substrate polymer are modified with different control agents. In further embodiments, the substrate polymer is modified with greater than two different control agents in different regions. In another preferred embodiment of this method, the different control agents at the at least two regions on the surface of the substrate polymer utilize chemically orthogonal conditions for subsequent graft polymerization.

The present invention also provides methods of graft polymerization on a solid support comprising: providing a substrate polymer comprising a non-functionalized surface; subjecting the substrate polymer to a radical-forming agent; and contacting the substrate polymer with a solution comprising monomer, solvent and a control agent under conditions wherein the temperature is less than about 80° C. The method results in a living/controlled polymerization of the monomer resulting in a graft polymer on the non-functionalized surface of the substrate polymer.

The invention also provides a method of generating co-polymers on a solid support comprising: providing a substrate polymer comprising a non-functionalized surface; subjecting the substrate polymer to a radical-forming agent; contacting the substrate polymer with a solution comprising monomer, solvent and a control agent under conditions wherein the temperature is less than about 80° C.; and contacting the substrate polymer with at least a second solution comprising a second monomer, solvent and a control agent under conditions wherein the temperature is less than 80° C. This method results in a controlled polymerization of said second monomer from the end of the first graft polymer on the non-functionalized surface resulting in a copolymer graft on the substrate polymer.

In preferred embodiments, these above-described methods of graft polymerization and co-polymerization may be conducted at temperatures less than 60° C. and preferably less than 45° C. in order to prevent heat damage to molded plastic substrates. In further preferred embodiments, the concentration of control agent as a mol % of monomer contacted to the substrate polymer is increased so as to minimize the depth of penetration or in-growth of the graft polymers. In particularly preferred embodiments, the concentration of control agent in the solution is between about 0.001 mol % and 1 mol %, and more preferably between 0.1 mol % and 0.3 mol % of the monomer concentration.

Another preferred embodiment of the invention provides a method of generating polymer grafts at a plurality of regions on the surface of a substrate polymer. This method comprises: providing a substrate polymer comprising a surface; subjecting a first region of the surface of the substrate polymer to a physical stress means; subjecting the first region of the surface of the substrate polymer to a radical-forming agent; contacting the substrate polymer with a first solution comprising a monomer, solvent and a control agent; subjecting at least a second region of the surface of the substrate polymer to a physical stress means; subjecting the at least a second region of the surface of the substrate polymer to a radical-forming agent; and contacting the substrate polymer with at least a second solution comprising a monomer, solvent and a control agent. The method thereby results in graft polymerization of the monomers in the first and at least second solutions at the first and at least second regions of the surface of the substrate polymer.

In a further embodiment of the present invention substrate polymers with surfaces modified with control agents made by the above-described methods are provided. In addition, the invention provides solid supports with a plurality of different graft polymers attached in different regions on the surface of the substrate polymer. In particularly preferred embodiments, the graft polymers have an average depth of penetration into the substrate polymer surface less than about 80 $\mu$m, preferably less than about 60 $\mu$m, and most preferably less than about 40 $\mu$m.

A still further aspect of the present invention is directed to a process of generating a population of one or more polymers comprising the structure:

$$Z-Q$$

wherein:

Z is a chemical moiety derived from a radical generated on a surface or sub-surface polymer forming part of a solid support and wherein said radical is formed by subjecting said solid support to physical and/or chemically-mediated radical forming means;

Q is a chemical moiety that imparts living free radical polymerization to a process and is derived from a compound capable of influencing or exerting control by formation of a reversible bond to the growing polymer chain such that radical—radical termination is reduced whilst retaining the ability to grow the polymer chains further when monomer is present; wherein said process comprises subjecting monomeric units or their precursors or oligomeric/macromeric polymer units to polymerization conditions wherein at least one monomer on each polymer is linked to said surface or sub-surface region of said solid support via a free radical generated on said solid support by radical-forming means.

Yet another aspect of the present invention provides a process of generating a population of one or more chemical species comprising the structure

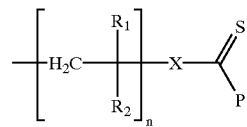

wherein:

R$_1$ and R$_2$ may be the same or different and each is hydrogen, halogen, optionally substituted C$_1$-C$_{10}$ alkyl, wherein the substitutions include hydroxy, alkoxy, aryloxy, carboxy, acyloxy, aroyloxy, alkoxy-carbonyl, aryloxy-carbonyl or halogen;

X is S, O, $NR_1$ or $(CR_1R_2)_n$;

P is S, O, $NR_1R_2$, $(CR_1R_2R_3)_n$ or $[Y]_mR_3$ wherein Y, when present, is selected from the same substituents as for P, n is an integer which may be 0, 1 or >1;

m is an integer $_1$ or >1; and $R_3$ is hydrogen, halogen (e.g. bromine, chlorine), optionally substituted alkyl, optionally substituted aryl, optionally substituted alkoxyl-carbonyl, optionally substituted aryloxycarbonyl, carboxy, optionally substituted acyloxy, optionally substituted carbamoyl, cyano, dialkyl, diarylphosphonato, heterocycle of ring size 5, 6, 7 or 8, dialkyl- or diaryl-phosphonato or a polymer chain; wherein said process comprises subjecting monomeric units or their precursors or oligomeric polymer units to polymerization conditions wherein at least one monomer on each polymer is linked to said surface or sub-surface region of said solid support via a free radical generated on said solid support by radical-forming means.

Another aspect of the present invention provides a process for generating a population of polymeric chains each comprising at least one monomeric unit anchored to a polymer on the surface or sub-surface of a solid support, said method comprising generating a surface or sub-surface region of a polymer forming at least part of said solid support for use in a polymerization process by subjecting said surface or sub-surface region of said polymer to radical-forming means for a time and under conditions sufficient to generate radicals, optionally capping said radicals by a control agent; simultaneously or sequentially contacting said surface to monomeric units or their precursors or oligomeric polymer units and subjecting same to polymerization means to permit the generation of chains of polymers anchored to said solid support.

One embodiment of the process for generating polymeric chains is a method of graft polymerization comprising: providing a substrate polymer comprising a non-functionalized surface; subjecting the substrate polymer to a radical-forming agent; and contacting the substrate polymer with a solution comprising monomer, solvent and a control agent under conditions wherein the temperature is less than about 80° C.; whereby controlled polymerization of said monomer occurs resulting in a graft polymer on the non-functionalized surface of the substrate polymer.

In a further embodiment of this process, co-polymeric (or ter-polymeric) chains may be generated on a substrate polymer by graft polymerization using the method comprising: providing a substrate polymer comprising a non-functionalized surface; subjecting the substrate polymer to a radical-forming agent; contacting the substrate polymer with a solution comprising a first monomer, solvent and a control agent under conditions wherein the temperature is less than 80° C.; whereby controlled polymerization of said first monomer occurs resulting in a graft polymer on the non-functionalized surface of the substrate polymer. And subsequently, contacting the substrate polymer with a solution comprising a second monomer, solvent and a control agent under conditions wherein the temperature is less than 80° C.; whereby controlled polymerization of said second monomer occurs from the end of the first polymer graft resulting in a copolymer graft on the surface of the substrate polymer. The steps of this method of polymerization may be repeated multiple times to generate complex co-polymer and ter-polymer grafts.

A further aspect of the present invention provides a process for the production of a population of two or more polymeric chains on a surface or sub-surface of a solid support, said process comprising subjecting monomeric units or their precursors or oligomeric polymer units to polymerization conditions wherein at least one monomer on each polymer is linked to said surface or sub-surface region of said solid support via a free radical generated on said solid support by radical-forming means.

DETAILED DESCRIPTION OF THE PREFERRED EMBODIMENTS

Figure 1:
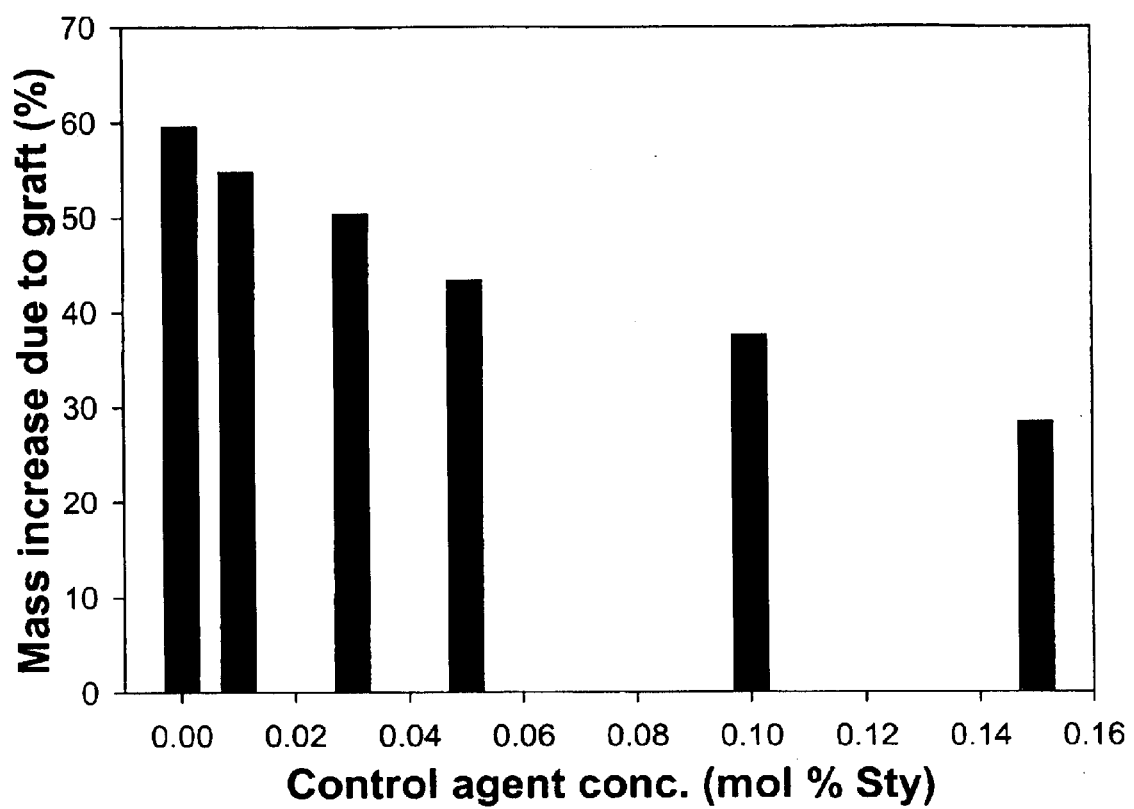
FIG. 1 is a graphical representation of substrate polymer mass increase versus control agent concentration for RAFT polymerization of polystyrene grafts on a non-functionalized polypropylene.

The present invention is predicated in part on the physical and/or chemical manipulation of the surface of a solid phase and more particularly the manipulation of the surface of a polymeric solid phase to render same suitable as an anchoring (i.e. grafting) substrate for a monomeric unit of a potentially growing polymeric chain.

The present invention is particularly predicated in part on the physical and/or chemical manipulation of a non-functionalized polymeric surface of a solid support to thereby generate radicals which may be employed as anchoring substrates (i.e. as grafting sites) for a living/controlled polymerization process in the presence of inter alia a control agent and monomeric units or their precursor forms. Alternatively, the radicals so generated may themselves be reversibly capped by a control agent resulting in a modified substrate polymer surface that may subsequently be used as a substrate for living/controlled polymerizations.

Accordingly, one aspect of the present invention contemplates a method for generating a surface or sub-surface region of a polymer forming at least part of a non-functionalized solid support for use in a living/controlled polymerization process, said method comprising subjecting said surface and/or sub-surface region of said polymer to radical-forming means for a time and under conditions sufficient to generate radicals wherein said radicals may be capped by a control agent for subsequent use or may participate in an anchoring reaction (i.e. a graft polymerization) of a monomer or its precursor.

Terms such as "solid support", "substrate polymer", "solid phase" and "solid phase support" are used interchangeably throughout the instant specification. The solid support may comprise a homopolymer or copolymer or ter-polymer or blend of polymers. The present invention encompasses, therefore, mono-layers and multi-layers including bi- and tri-layers of homopolymers, copolymers, ter-polymers and/or blends of polymers, the surface or sub-surface region of which, is employed as a substrate for a first monomer or its precursor form during a living polymerization process.

The term "substrate polymer" is not to impart any limitation as to the structure or chemical composition of the polymer. The term "substrate polymer" in this context includes any polymer or any point, area or other region on the surface or sub-surface, which preferably is co-continuous with the external environment, and which is capable of presenting radicals to an external moiety such as a control agent or monomeric unit or precursor form thereof.

Reference to a particular point, area or other region of a substrate polymer means that selected surface or sub-surface areas of a substrate polymer may be capable of participating in chemical reactions via generated radicals. This is useful in the generation of a surface with a plurality of different polymer attached at different regions (i.e. an array).

Useful solid supports also include but are not limited to co-continuous porous and non-porous forms of polyolefins, such as polyethylene and polypropylene and their copolymers, and fluoropolymers such as teflons. Other useful polymeric solid supports useful with the present invention are those comprising polyalkenes, substituted acrylic polymers; vinyl halide polymers; polyvinylethers; polyvinylesters; silicone polymers; natural or synthetic rubber; polyurethane; polyamide; polyester; formaldehyde resin; polycarbonate; polyoxymethylene; polyether; and epoxy resin. Specific examples of commercial substrate polymers useful with the invention include SANTOPRENE® 65 (thermoplastic elastomer), PMA6100, and HET6100.

The term "substrate polymer" also includes an organic/polymer coating on a solid support, for example, a coating on an organic material or on a metallic, glass or other non-organic material.

In some preferred embodiments, the methods of the present invention involve the generation of radicals directly on a surface of a polymeric solid support (i.e. on a non-functionalized support). However, the present invention also provides methods that may be carried out on solidsupports with surfaces functionalized by chemical methods well-known in the polymer art.

Reference herein to a "polymer" on the solid support or in the anchored, or grafted, polymeric chain or growing polymeric chain encompasses a copolymer including a ter-polymer or other form of multi-polymeric material including a blend of polymers. The term "polymer" is not to be construed as excluding a copolymer or multi-polymeric material such as blends of polymers. The term "polymer" also includes natural and synthetic polymers including lipid bi-layers, dextran-derived carbohydrates, polynucleotide sequences, peptides, polypeptides and proteins. The polymer structure may be random co-and ter-polymers, sequential (as in tapered or blocks) and branched systems such as combs, ladders, hyperbranched or dendritic, and multi-arm systems such as stars and microgels and the like. The term "polymer" also includes an oligomeric structure.

Reference herein to an "oligomeric polymer" includes polymers comprising greater than two monomeric units such as up to about 20,000 homo- or hetero-units.

As used herein, the term "monomer" includes a single chemical entity or a large macromonomeric structure including a macromer, an oligomer or a polymer.

Monomers include oligomers, macromers and any reactive entity which can be added to a growing polymeric chain. In this context, therefore, a "monomer" added to the solid support or to a growing chain may also be a polymeric unit. The term "monomer" is not to be construed solely as a single unit of a multiunit polymer since the monomer may itself be polymeric.

Monomers used herein include, therefore, acrylate and methacrylate esters, acrylic and methacrylic acid, styrene, acrylamide and methacrylamide as well as their N-substituted derivatives, methacrylonitrile, mixtures of these monomers, and mixtures of these monomers with other monomers. As one skilled in the art would recognize, the choice of co-monomers is determined by their steric and electronic properties and the factors that determine co-polymerizability of various monomers are well documented in the art.

Monomers or co-monomers (including reactive macromers/oligomers) contemplated by the present invention include methyl methacrylate, ethyl methacrylate, propyl methacrylate (all isomers), butyl methacrylate (all isomers), 2-ethylhexyl methacrylate, ethyl-α-hydroxymethacrylate, isobromyl methacrylate, methacrylic acid, benzyl methacrylate, phenyl methacrylate, tetrahydrofurfural methacrylate, methacrylonitrile, alpha-methylstyrene, methyl acrylate, ethyl acrylate, propyl acrylate (all isomers), butyl acrylate (all isomers), 2-ethylhexyl acrylate, isobromyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, ethacrylamide, N-methylacrylamide, N,N-dimethylacrylamide, N-tertbutylmethacrylamide, N-n-butylmethacrylamide, N-methylomethacrylamide, N-ethylolmethacrylamide, N-tert-butylacrylamide, N-n-butylacrylamide, N-methylolacrylamide, N-ethylolacrylamide, vinylbenzoic acid (all isomers), diethylaminostyrene (all isomers), alpha-methyl vinyl benzoic acid (all isomers), di ethylamino alpha-methylstyrene (all isomers), p-vinylbenzene sulfonic acid, p-vinylbenzene sulfonic and sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, 3-isopropenyl-a,a-dimethylbenzyl isocyanate, N-vinylpyrrolidone, N-vinylcarbazole, butadiene, isoprene, chloroprene, ethylene and propylene.

Another aspect of the present invention provides a polymeric surface or sub-surface region on or part of a solid support for use to graft a monomeric unit or its precursor as part of a living/controlled polymerization process. In this aspect, the polymeric surface or sub-surface region subjected to radical-forming means for a time and under conditions sufficient to generate radicals capable of being reactive with a capping agent and/or said monomeric unit or its precursor form. The surface or sub-surface region of the solid phase polymer is, therefore, manipulated by radical-forming means to generate radicals which in turn are able to participate in a chemical reaction with a capping agent to effectively quench the radical until subsequently needed or with a monomeric unit or precursor form thereof as part of a growing polymer chain.

The radicals may be formed on the surface of the polymeric substrate or in a sub-surface region. In some embodiments the surface and/or sub-surface regions of the substrate polymer may be functionalized prior to radical generation. In particularly preferred embodiments, radicals are generated directly on a non-functionalized substrate polymer's surface and/or sub-surface regions.

Reference to a sub-surface region includes regions co-continuous with the external environment. A polymeric region is co-continuous with the external environment when it comprises functional groups freely accessible, i.e. co-continuous, to the external environment. An "external environment" in this context includes a surrounding solvent, solution or other liquid, solid or gaseous environment comprising, for example, reactive entities relative to the functional groups or any reactive groups attached thereto. More particularly, a sub-surface region is co-continuous with the external environment when radical-forming means are capable of generating radicals in the sub-surface region and the sub-surface region is in contact with an external environment comprising a control agent and/or monomeric units or precursor forms of the monomeric units.

The benefit of being able to generate radicals in sub-surface regions and having those radicals co-continuous with the external environment is that it permits the use of living polymerization to manipulate or otherwise generate polymeric pores or regions having particular architectural properties. Methods of making substrate polymers with co-continuous architectures useful with the present invention are disclosed in co-pending patent application U.S. Ser. No. 10/052,907 filed Jan. 17, 2002, and which is hereby incorporated herein by reference.

The polymeric surface or sub-surface region after being subjected to radical-forming means effectively becomes a substrate for anchoring/grafting monomeric units and/or a control agent. The present invention provides, therefore, a method for generating a substrate polymer comprising surface and/or sub-surface regions useful as a solid support for living/controlled polymerizations. This method comprises subjecting the substrate polymer to radical-forming means for a time and under conditions sufficient to generate a population of radicals on its surface or sub-surface regions. These radicals may then chemically react with a control agent, and/or a monomeric unit or precursor form of a monomer unit, to form a modified substrate polymer surface.

As used herein, the terms "radical-forming means" and "radical-forming agent" are used interchangeably to refer to any form of pressure or force achieved by applying physical stress (i.e. physical stress means), or any chemical reaction induced by chemical means, capable of generating a radical. The radical-forming means (i.e. radical-forming agent) may be applied to the entire polymer or to selected or random points or areas including regions thereof. The term "radical" is used herein in its ordinary sense and refers to any atom having an unpaired electron. A measure of sufficient physical stress means or chemical means is conveniently determined by its ability to generate radicals on a polymer.

Examples of physical stress means include but are not limited to physical movement such as stretching, twisting, indenting, bending, cutting or compression. Physical stress means also encompasses radiation-induced stress including particle radiation such as exposure to plasma including atomic particle, vacuum U.V. and plasma discharge irradiation, ionizing radiation including y-irradiation and electron beam irradiation, laser, U.V. and temperature irradiation such as exposure to high or low levels of temperature. Methods of using physical stress means to enhance radical generation on solid supports are disclosed in copending PCT/AU01/01638 filed Dec. 21, 2001, entitled "Modifying the surface of polymer substrates by graft polymerization", and which is hereby incorporated herein by reference.

Chemically-induced radical formation includes any chemical process or reaction resulting in radical formation. Examples of chemically-induced radical formation include the use of peroxy or alkoxy radicals and oxidation followed by Norrish type process.

Particularly preferred radicals are formed from atoms within functional groups or atoms in the backbone or skeleton of a polymer chain. The radicals may also be referred to as "polymeric radicals" and promote a form of "chain extension" with a monomer unit or a monomer within an oligomeric polymer chain, generally but not exclusively resulting in an anchored monomer or oligomeric polymer having a radical, which may be reversibly capped with a control agent, which can further react with a monomer or oligomeric polymer to continue chain extension.

Although any radical is contemplated by the present invention, the most preferred radical is a carbon-centered radical. The carbon-centered radical may be formed by any number of physical and/or chemical processes well known to those familiar with the art; such as radiation-induced stress including particle radiation such as exposure to plasma including atomic particle, vacuum U.V. and plasma discharge irradiation, ionizing radiation including γ-irradiation and electron beam irradiation, laser, U.V. and temperature irradiation such as exposure to high or low levels of temperature, chemically-induced hydrogen abstraction and radical propagation.

Once the radical has been formed on the surface polymer and/or on a sub-surface polymer co-continuous with an external environment, or simultaneously with radical formation, the radical may be "capped" by a control agent (CA) and/or the radical surface or sub-surface polymers may be used for the generation of polymeric or oligomeric polymer chains which are terminated by control agents, as has been described above.

Reference to a "control agent" or "capping agent" includes reference to any inorganic or organic chemical entity capable of influencing or exerting control by formation of a reversible bond to the growing polymer chain such that radical-radical termination is reduced, whilst retaining the ability to grow the polymer chains further when monomer is present. An effect of such control agent might be the generation of a low dispersity of macromolecular sizes of anchored polymer chains.

As used herein, the term "control agent" or "capping agent" also includes those compounds used in living/controlled polymerization reactions that are referred to as e.g.

"chain transfer agents" or "initiators" (e.g. halogenated compounds such as $CBr_4$).

A range of capping agents may be employed which generally, after physical or physico-chemical intervention (e.g. heat or irradiation), convert to a form which promotes living/controlled free radical polymerization of a monomer unit or oligomeric polymer unit.

There are a range of control agents contemplated herein which are capable of reversibly capping the initial radical formed by physical and/or chemical means, thereby inducing a living/controlled free radical polymerization process. To achieve these desired effects, the control agent is central to the required dynamic equilibrium between dormant and active chain ends. In so doing, the main chain carrier of the free radical polymerization is a carbon centered radical, the control over the reaction is exerted by a reversible capping mechanism so that there is an equilibrium between dormant and active chains. This has the effect of reducing the overall radical concentration, thereby suppressing radical-radical termination events.

Also, as used herein, the term "control agent" encompasses the use of a single control agent or different control agents used under different conditions. The present invention contemplates multiple different control agents (e.g. RAFT and ATRP), on a single solid support, that react under different conditions. In a particularly preferred embodiment, the different control agents induce living/controlled polymerization under orthogonal reaction conditions (i.e. conditions may be selected wherein living/controlled polymerization occurs only at the sites of one of the types of control agents at a time).

In another preferred embodiment, the different control agents are attached at different regions on the surface of the substrate polymer. In this embodiment, different graft polymerizations may be carried out at different regions on the surface by selecting orthogonal reaction conditions. Consequently, this embodiment provides substrate polymers with different graft polymers in different regions on the surface.

Once a substrate polymer is modified with a control agent, living/controlled polymerization may occur from the support under such conditions as are appropriate for the specific control agent (or agents) that are present. Such conditions, e.g. for RAFT, ATRP or nitroxide-mediated living/controlled polymerizations are well-known in the art. Generally, the substrate polymer is contacted with a solution including a solvent, monomer and the control agent and allowed to react under selected temperature conditions for a period of time. In a preferred embodiment of the present invention, the temperature conditions are maintained below 80° C., more preferably under 60° C., and most preferably below 45° C. throughout the course of the polymerization reaction. By maintaining these lower temperature, grafts may be polymerized on solid supports without causing deformation of a molded substrate polymer, or other undesirable effects that occur during high reaction temperatures.

A particularly advantageous property of living/controlled polymerization is that the molecular weight of the polymer grows in a linear fashion with time/conversion. The "living" polymers are distinguished from dead polymers by being able to grow whenever additional monomer is supplied. In addition, block copolymers can be prepared by sequential monomer addition.

In a particularly preferred embodiment of the present invention, the in-growth of polymers generated by living/controlled polymerizations on a substrate polymer may be controlled based on the concentration of control agent present. In-growth as used herein refers to the depth of penetration of polymer chains into the bulk of the solid support. When used in solid phase synthesis, sites on polymeric solid supports with lower in-growth yield lower amounts of undesirable reaction products (i.e. impurities). In preferred embodiments of the present invention, the concentration of control agent used in a living/controlled polymerization on a substrate polymer is between about 0.001 and 1 mol % of the concentration of monomer. In particularly preferred embodiments the control agent concentration is between about 0.001 and 0.3 mol %, and more preferably, 0.1 and 0.3 mol % of the monomer concentration.

The depth of penetration (i.e. in-growth) of a polymer graft into a solid support may be characterized by the thickness of the boundary layer between the substrate polymer and the graft on the surface. The boundary layer between a polymer graft and the polymer of the solid support generally corresponds to the region wherein the two different polymers overlap. The thinner the region of overlap, the less in-growth has occurred during the living/controlled polymerization process that produces the graft.

Decreased boundary layer thickness due to decreased in-growth may be characterized by a number of solid-phase physical characterization techniques well-known in the art, such as Raman micro-spectroscopy and attenuated total reflectance infrared (ATR-IR) spectroscopy. For example, a series of Raman spectra may be obtained at different points on a cross-section of a polymeric solid support from its surface towards its interior. The plot of the relative intensities of signals due to the graft polymer versus the substrate polymer indicates the thickness of the boundary layer and, consequently, the degree of graft polymer in-growth during the living/controlled polymerization process.

In preferred embodiments, the present invention provides methods of making substrate polymers with graft polymers exhibiting an average depth of penetration less than about 80 μm, more preferably less than 60 μm, and most preferably less than 40 μm into the surface of the substrate polymer.

There are a number of different control agents available that induce living/controlled polymerization reactions by different mechanisms. In reversible-addition-fragmentation transfer (RAFT) polymerizations, the control agent is typically a dithioester or related compound. RAFT control agents useful with the present invention include, for example, 1-phenylprop-2-yl phenyldithioacetate; 1-phenylethyl phenyldithioacetate, cumyl phenylditioacetate, 2-phenylprop-2-yl dithiobenzoate; 1-phenylprop-2-yl p-bromodithiobenzoate; 1-phenylethyl dithiobenzoate; 2-cyanoprop-2-yl dithiobenzoate; 4-cyanopentanoic acid dithiobenzoate; 1-acetoxyethyl dithiobenzoate; hexakis(thiobenzoylthiomethyl)benzene; 1,4-bis(thiobenzoylthiomethyl)benzene; 1,2,4,5-tetrakis (thiobenzoylthiomethyl)benzene; ethoxycarbonylmethyl dithioacetate; 2-(ethoxycarbonyl)prop-2-yl dithiobenzoate; tert-butyl dithiobenzoate; 1,4-bis(2-thiobenzoylthioprop-2- yl)benzene; 4-cyano-4-(thiobenzoylthio)pentanoic acid; dibenzyl trithiocarbonate; carboxymethyl dithiobenzoate; s-benzyl diethoxyphosphinyldothioformate; 2,4,4-trimethylpent-2-yl dithiobenzoate; 2-(ethoxycarbonyl)prop-2-yl dithiobenzoate; 2-phenylprop-2-yl 1-dithionaphthalate; 2-phenylprop-2-yl 4-chlorodithiobenzoate.

There is a variety of atom transfer radical polymerization (ATRP) control agents, well known in the art, that are useful with the present invention. ATRP control agents and living/controlled reaction conditions useful with the present invention are disclosed in, for example, U.S. Pat. Nos. 5,789,487 and 6,310,149 B1, both of which are incorporated herein by reference. Among the ATRP control groups described in the art are, for example, the Cu-based compounds of the general formula CuX, wherein X=Br, Cl, I, and the other Cu ligands are selected from the list comprising: 4,4'-di(5-nonyl)-2,2'-bipyridine; 2,2'-bipyridine, N-alkyl-2-pyridylmethanimine (N-propyl, N-pentyl, N-butyl); N,N,N',N'',N''-pentamethyldiethylenetriamine; N,N,N'',N''',N'''-hexamethyltriethylenetetraamine; and tris-(2-(dimethylamino)ethyl)amine.

In addition, other metal-mediated ATRP control agents known in the art that are useful with the present invention include: Fe(cyclopentadienyl)(CO)$_2$I; Ti(OiPr)$_4$; and Ru(pentamethylcyclopentadienyl)Cl(PPh$_3$)$_2$; Ru(cyclopentadienyl)Cl(PPh$_3$)$_2$; Ru(indenyl)Cl(PPh$_3$)$_2$.

Other suitable control agents may be found by considering the number of "metal mediated" radical polymerization methods, and appropriate iniferters, initers and chain transfer agents. For example, the chain transfer agent, CBr$_4$, and similar halogenated "initiator" compounds as disclosed in U.S. Pat. Nos. 5,789,487, 6,310,149 B1, and Canadian Patent No. 2,341,387, are considered suitable control agents for the purposes of some embodiments of the present invention. For example, the present invention provides methods for generating substrate polymers modified with CBr$_4$ that are useful for graft polymerization.

Besides RAFT and ATRP, nitroxide-mediated living/controlled polymerizations may be useful with the present invention. Any of several nitroxide-based control agent molecules known in the art, such as TEMPO and DTNB, may be used for such polymerizations.

It would be readily understood that both the manner and sequence in which the generated carbon-radical may be formed and capped may vary. For instance, a radical may be induced directly on, throughout or over the solid support in an inert atmosphere, where it may subsequently be capped by treatment with a control agent (CA), either in a solution or neat. In an alternative embodiment, the radical forming means (RFM) may be applied directly on, throughout or over the solid support in the presence of the control agent, either in a suitable solvent or neat. In a further alternative embodiment, the process may be effected by applying the radical forming means directly on, throughout or over the solid support in the presence of control agent, either in a suitable solvent or neat, and in the added presence of a monomer.

Such processes contemplated by the present invention as being appropriate for generating a solid support capped with a control agent may be described schematically as follows:

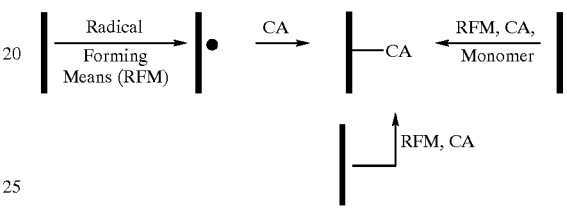

In the present specification, the substrate polymer comprising the solid support is represented by a heavy black bar.

It will be recognized by suitably skilled persons that a range of additional processes is available, any one of which may be successfully employed to afford carbon-centered radicals which may be capped by a control agent. One such additional process involves generating directly on, throughout or over the solid support a functional coating, such as a vinyl functionality, that is reactive towards radicals. Many methods are known for the generation of vinyl groups on a surface and these range from grafting reactions in the presence of a multi-functional monomer to condensation of a moiety comprising a vinyl group, such as condensation of acryloyl chloride, methacrylic anhydride or azlactone, among others. Processes that afford a solid support comprising vinyl groups may be described schematically as follows:

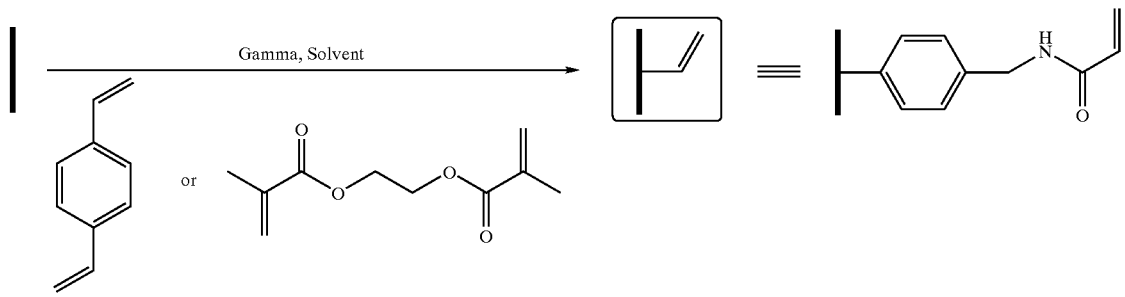

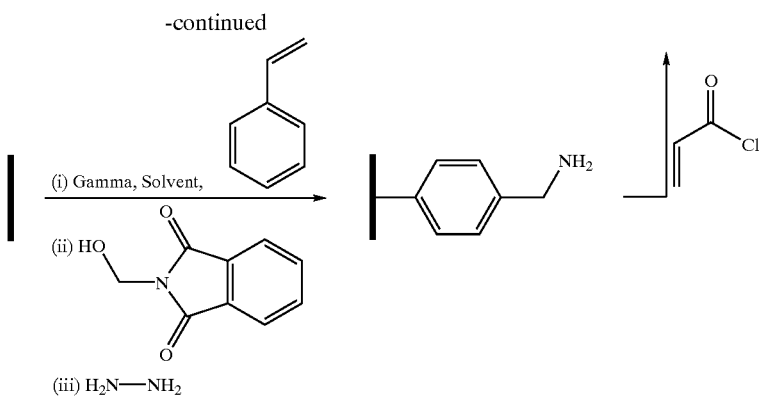

The vinyl functional substrate is capped via its inclusion in a capping formulation comprising monomer and/or control agent and an initiating source. Such formulations are built by virtue of the controlled nature of the polymerization in solution. Hence polymerizing through the surface-bound vinyl functionality incorporates a chain, which is terminated with a control agent onto and from the surface, as shown schematically in "I", below. In another embodiment, a similar outcome may be achieved by activating a stoichiometric equivalence of peroxy-based initiator and control agent to afford an adduct of the control agent and the substrate, as shown schematically in "II" below. In yet a further embodiment, the addition of hydrogen bromide (HBr), or similar reagent across the styrene unit may lead to an ATRP-initiating fragment, as shown schematically in "III" below.

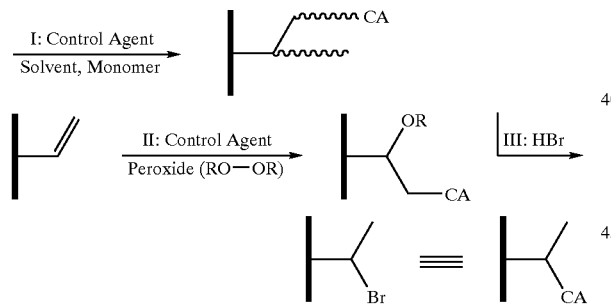

Yet another embodiment of the present invention contemplates the formation of a carbon-centered radical from a surface-initiated polymerization, wherein the initiator is a standard free radical initiator well known in the art, such as a peroxide (I) and diazo moiety, that has been bound or otherwise generated on a solid support. When initiated in the presence of monomer and/or control agent, the solid support is activated by the presence of a control agent. An exemplary process may be illustrated as in the following schematic:

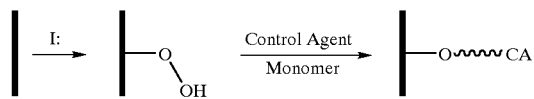

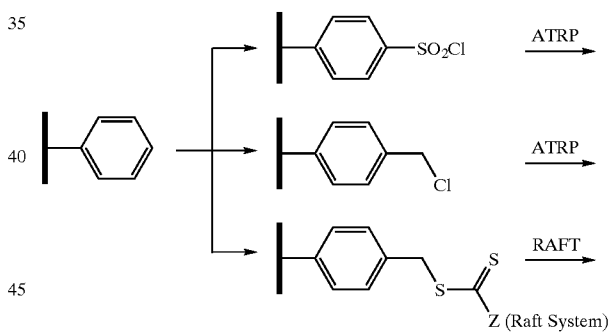

In the present specification, the oscillating line represents a growing polymer chain.

The process may also be achieved by the direct chemical modification of a solid support, resulting in the synthesis of a bound initiated fragment, essential for controlled polymerization to occur. One such transformation, for a polystyrene grafted support, may be illustrated schematically as shown below.

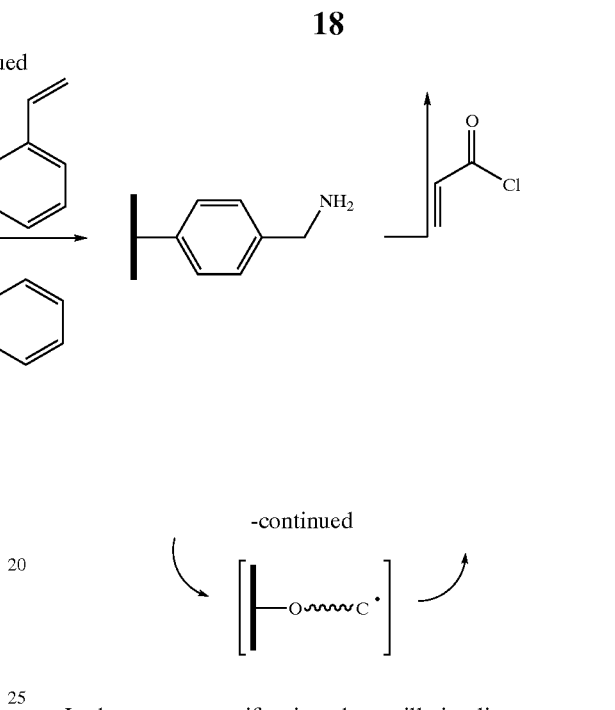

Once functionalized, polymerization is performed under the conditions required for the particular control agent. That is, once the control agent has been linked to the solid support, growth of the same or a different macromolecule may continue, under such living/controlled polymerization conditions as are appropriate for whatever control agent is present.

The present invention further contemplates the use of the surface of the solid support to grow anchored polymeric chains. The polymerization process may be applied immediately or otherwise sequentially to generating the radicals on the polymer on the solid support, or may be initiated simultaneously with the radical-forming means.

Accordingly, another aspect of the present invention provides a process for generating a population of polymeric chains each comprising at least one monomeric unit anchored to a polymer on the surface or sub-surface of a solid support, said method comprising generating a surface or sub-surface region of a polymer forming at least part of said solid support for use in a polymerization process by subjecting said surface or sub-surface region of said polymer to radical-forming means for a time and under conditions sufficient to generate radicals, optionally capping said radicals by a control agent; simultaneously or sequentially contacting said surface to monomeric units or their precursors or oligomeric polymer units and subjecting same to polymerization means to permit the generation of chains of polymers anchored to said solid support.

A polymeric chain may be linear or branched and may grow from a single monomer anchored to said solid support or the polymeric chain may have multiple anchoring points on said surface or sub-surface polymer. The terms "chain formation" or "growing polymer chain" include linear (such as blocks and tapered systems) and branched chain (such as combs and hyperbranched) formation.

A "sub-surface" polymer is a polymer being co-continuous with an external environment. Reference to an external environment includes reference to solid, liquid and gaseous phases exogenously applied to said solid support.

The present invention further contemplates sub-surface polymers in the form of pores co-continuous with the external environment.

As stated above, the solid support may be a single polymeric layer or multiple homopolymeric or heteropolymer layers or blends of polymers. A "heteropolymer" encompasses a copolymer and/or a ter-polymer.

Reference herein to "polymerization" includes any process by which monomers or oligomeric polymers are added to a terminal region of a polymer chain. The present invention contemplates living polymerization processes including free radical living polymerization, anionic polymerization and cationic polymerization.

As used herein, "polymerization" processes may involve any mechanism by which polymeric chains grow and including combinations of mechanisms, such as the alternating sequential use of different polymerization processes. For example, the present invention contemplates a combination of living/controlled polymerizations and free radical, anionic and/or cationic polymerizations on a sequential or alternating basis. Consequently, the polymerization methods of the present invention may be used to produce homopolymers, random copolymers, ter-polymers and/or block polymers.

Polymerization processes of the present invention include living/controlled polymerization in the presence of control agents. Such processes are capable of influencing or exerting control of the polymerization reaction by formation of a reversible bond to the growing polymer chain such that radical—radical termination is reduced, while retaining the ability to grow the polymer chains further (i.e. reinitiate polymerization) when monomer is present. The moiety influencing control can be an atom or molecule, organic or inorganic, of synthetic or natural origin.

The present invention provides, therefore, a process for the living/controlled polymerization of a population of two or more polymeric chains (i.e. grafts) on a surface or sub-surface of a solid support, said process comprising subjecting monomeric units or their precursors or oligomeric polymer units to polymerization conditions wherein at least one monomer on each polymer is linked to said surface or sub-surface region of said solid support via a free radical generated on said solid support by radical-forming means.

The general features of the living/controlled polymerization methods contemplated by the invention include:

(1) the main chain carrier is a radical such as, but not limited to, a carbon- or oxygen-centered radical;

(2) the control over the reaction is exerted by a reversible capping mechanism so that there is an equilibrium between dormant and active chains;

(3) the molecular weight of the polymer grows in a linear fashion with time/conversion; and (4) "living" polymers are distinguished from dead polymers by being able to grow whenever additional monomer is supplied.

By using this living/controlled polymerization process, polymers including homopolymers and copolymers are produced such as block, graft, tapered, cross-linked and branched polymers. Living/controlled polymerization involves the use of capping agents as indicated above.

Without wishing to limit the present invention to any one theory or mode of action, living/controlled polymerization may be achieved by trapping a carbon-centered radical generated directly or indirectly on, throughout, or over a solid support. This includes radicals generated on a non-functionalized surface of a substrate polymer. The radical may be induced by a number of processes well known to those skilled in the art, that may act directly on, throughout, or over the solid support, or in a sequential manner, such that the resultant process generates a radical. Once generated, the carbon-centered radical may then be capped by a control agent resulting in a substrate polymer with a surface modified with a control agent. These control agent modified substrate polymers may then be used as solid supports for graft polymerization by living/controlled processes.

Multiple capping agents may also be employed. For example, a single solid support may be modified with a mixture or separate solutions of control agents. The resulting modified surface may then be used in different living/controlled polymerization reactions for each of the different control agents. In this manner, a plurality of different grafts may be polymerized on a substrate polymer surface. In a further embodiment, different localized areas or regions on the surface of a single solid support may be modified each with a different control agent. A substrate polymer so modified with control agents may then be used to generate different graft polymers in each of the different regions via living/controlled polymerization processes. Preferably the different control agents in the different regions undergo living/controlled polymerization under orthogonal reaction conditions.

Capping may be achieved by any one of a number of different routes, depending on the control agent. For example, where the capping agent contemplated is of the alkoxyamine type as described above, a bi-molecular radical condensation may occur between the oxygen-centered radical of the nitroxide and a carbon-centered radical. Where, instead, capping is achieved via a reversible addition fragmentation chain termination (RAFT), a carbon-centered radical may add to a RAFT agent, resulting in the covalent coupling of a fragment of a RAFT agent to a carbon-centered radical. Further contemplated is a reverse atom transfer radical polymerization (ATRP) process, which may afford a useful bound initiator system.

The RAFT and nitroxide processes may be described schematically as follows:

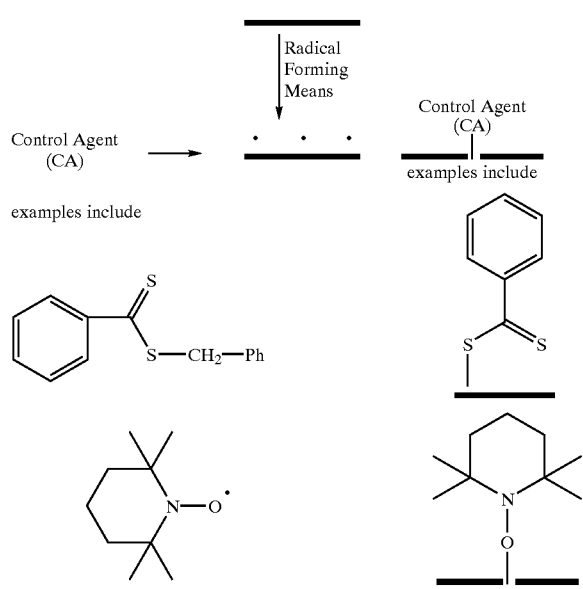

Another aspect of the present invention is directed to a process of generating a population of one or more polymers comprising the structure:

Z—Q wherein:
- Z is a chemical moiety derived from a radical generated on a surface or sub-surface polymer forming part of a solid support and wherein said radical is formed by subjecting said solid support to physical and/or chemically-mediated radical forming means;
- Q is a chemical moiety that imparts living free radical polymerization to a process and is derived from a compound capable of influencing or exerting control by formation of a reversible bond to the growing polymer chain such that radical—radical termination is reduced whilst retaining the ability to grow the polymer chains further when monomer is present; and, wherein said process comprises subjecting monomeric units or their precursors or oligomeric polymer units to polymerization conditions wherein at least one monomer on each polymer is linked to said surface or sub-surface region of said solid support via a free radical generated on said solid support by radical-forming means.

Yet another aspect of the present invention provides a process of generating a population of one or more chemical species comprising the structure

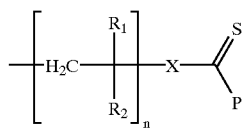

wherein:
- $R_1$ and $R_2$ may be the same or different and each is hydrogen, halogen, optionally substituted $C_1$-$C_{10}$ alkyl, wherein the substitutions include hydroxy, alkoxy, aryloxy, carbonxy, acyloxy, aroyloxy, alkoxy-carbonyl, aryloxy-carbonyl or halogen;
- X is S, O, $NR_1$ or $(CR_1R_2)_n$;
- P is S, O, $NR_1R_2$, $(CR_1R_2R_3)_n$ or $[Y]_m R_3$ wherein Y, when present, is selected from the same substitutents as for P,
- n is an integer which may be 0, 1 or >1;
- m is an integer 1 or >1; and
- $R_3$ is hydrogen, halogen (e.g. bromine, chlorine), optionally substituted alkyl, optionally substituted aryl, optionally substituted alkoxyl-carbonyl, optionally substituted aryloxycarbonyl, carboxy, optionally substituted acyloxy, optionally substituted carbamyol, cyano, dialkyl, diarylphosphonato, heterocycle of ring size 5, 6, 7 or 8, dialkyl- or diaryl-phosphonato or a polymer chain; and, wherein said process comprises subjecting monomeric units or their precursors or oligomeric polymer units to polymerization conditions wherein at least one monomer on each polymer is linked to said surface or sub-surface region of said solid support via a free radical generated on said solid support by radical-forming means.

This aspect of the present invention provides a free radical polymerization process with living characteristics by polymerizing one or more free radically polymerizable monomers or oligomeric polymers in the presence of a source of initiating free radicals and a chain transfer agent. The initiating radicals are on the surface or sub-surface of a polymer or polymers forming part of a solid support.

Yet another aspect of the present invention contemplates the manipulation of polymeric chains anchored to a solid support to generate particular chemistries including reactive or functional groups at a terminal portion of the polymer. In one example, a "linker" or other functional molecule is incorporated in addition to or in place of a capping agent to facilitate further polymer growth or addition or to anchor various biomolecules. In one particular example, the control agent is subsequently utilized to act as an initiation point for the assembly of or the attachment of chemical species. These chemical species include biomolecules such as proteins, DNA and their synthetic variants. These chemical species, by virtue of the underlying, layer grafted via living/controlled free radical polymerization, are presented and displayed in useful manners, and in a way which allows for the modification and cleavage of same from the grafted surface. If more than one type of linker is employed, the present invention extends to selectively cleaving and modifying the attached molecules.

Various aspects of the present invention may be conducted in an automated or semi-automated manner, generally with the assistance of well-known data processing methods. Computer programs and other data processing methods well known in the art may be used to store information of preferred substrate polymer surface, control agent modifications of the surface and grafted polymer and co-polymer characteristics. Data processing methods well known in the art may be used to read input data covering the desired characteristics.

Alternatively, or in addition, data processing methods well known in the art may be used to control the processes involved in the present invention, including e.g. the application of physical stress involved in the grafting process, and/or the living/controlled polymerization process, and/or the reactions and interactions occurring in, within or between a population or array of polymers grafted to a substrate polymer.

The present invention is further described by the following non-limiting examples.

EXAMPLES

Example 1

Materials

Washed and extracted plastic samples used in the examples hereunder include the following, referred to by their trade names as indicated:

1. Thermoplastic polymers having a range of hardness from 35 "shore A " to 50 "shore D" with the ratio of EPDM rubber to polypropylene determining the hardness. They are moldable, extrudable or thermoformed into desired shape. They show brittle point well below −60°C. Modulus values are 1 to 10 MPa at 25° C. Tensile Strength from 2.0 to 28 Mpa at 25° C. The rubbery part of the polymers can be partially or completely cross-linked. An example of such substrate polymers is commercially available from Exxon under the trade name "SANTOPRENE®" (thermoplastic elastomer).

2. Polymers having a Hardness Shore "D" not less than 60, preferably 60–68; Flexural Modulus values of 800–1200 MPa and Impact Strength values of 5–12 KJ/m$^2$ at 23° C. The polymers should be injection molded or extruded using set parameters suitable to generate a crystallinity level of 20–50%, as well as a Melt Flow Index not less than 1 and preferably 4–14. An example of such a polymer is commercially available from Montel under the trade name "PMA6100".

3. Polymers having a Hardness Shore "D" not less than 60, preferably 60–68; Flexural Modulus values of 900–1400 MPa and Impact Strength values of 7–14 KJ/m$^2$ at 23° C. The polymers should be extruded using set parameters suitable to generate a crystallinity level of 20–50%, as well as a Melt Flow Index not less than 1 and preferably 1–4. An example of such a polymer is commercially available from Montel under the trade name "HET6100".

Example 2

Gamma Irradiation

Gamma irradiation was performed by treating desired plastic samples in glass vials. The samples were purged with nitrogen via a series of evacuations and fill cycles, and sealed. The samples were then exposed to a dose of gamma-irradiation, from a Cobolt 60 source, such that the samples received a dose in the range 7–50 kGy. Depending on the desired outcome, gamma treatment occurred in the absence or presence of solvent(s), monomer(s) and control agent(s).

Example 3

Control Agents

The control agents were prepared by literature techniques and include the following compounds listed in Table 1 below:

TABLE 1

| Type | Structure | Reference Name |
|---|---|---|
| RAFT | (phenyl-C(=S)-S-CH$_2$Ph) | TCE |
| RAFT | (phenyl-C(=S)-S-S-C(=S)-phenyl) | TCDS |
| RAFT | (phenyl-CH$_2$-C(=S)-S-CH(CH$_3$)-phenyl) | PEPDTA |
| RAFT | (phenyl-C(=S)-S-C(CH$_3$)$_2$-phenyl) | CDTB |
| Nitroxide | (TEMPO structure, N—O•) | TEMPO |
| Nitroxide | (di-tert-butyl nitroxide structure) | DTBN |

Example 4

Generation, Subsequent Trapping and Linear Chain Extension

Various plastics, prepared as outlined in Example 1 above and listed in Table 2 below, were placed into a glass vessel and sealed with a septum. The atmosphere within the vessel was evacuated and replaced with nitrogen gas and the cycle repeated 3 times. The plastics were then exposed to a dose of gamma irradiation, as outlined above in Example 2. The irradiated plastics were then treated with a degassed solution of a control agent, described above in Example 3 and listed below in Table 2. The solution was introduced via syringe, and the mixture was left to stand with agitation at room temperature for 16 hours, after which it was washed extensively with dichloromethane (DCM) and then dried.

The dried plastic samples were then added to a polymerization vessel comprising monomer, and the solution sparged with nitrogen for 15 minutes. The vessel was then sealed and heated at the prescribed temperature for the specified time, as listed in Table 2 below. After polymerization had been effected, the samples were washed extensively with (DCM) and then dried.

TABLE 2

| Solid Support | Control Agent | | | Polymerization Process | | % Weight Gain |
| --- | --- | --- | --- | --- | --- | --- |
| | Type | Solvent | Concentration | Monomer | Conditions | |
| PMA6100 | TEMPO | Dichloromethane | 0.05% | Styrene, neat | 80° C./16 hours | 14 |
| HET6100 | TEMPO | Dichloromethane | 0.05% | Styrene, neat | 80° C./16 hours | 7 |
| SANTOPRENE ® 65 | TEMPO | Dichloromethane | 0.05% | Styrene, neat | 80° C./16 hours | 26 |
| PMA6100 | TCE | Dichloromethane | 0.05% | Styrene, neat | 60° C./16 hours$^A$ | 12 |
| HET6100 | TCE | Dichloromethane | 0.05% | Styrene, neat | 60° C./16 hours$^A$ | 19 |
| SANTOPRENE ® 65 | TCE | Dichloromethane | 0.05% | Styrene, neat | 60° C./16 hours$^A$ | 30 |
| PMA6100 | TCDS | Dichloromethane | 0.05% | Styrene, neat | 60° C./16 hours$^A$ | 11 |
| HET6100 | TCDS | Dichloromethane | 0.05% | Styrene, neat | 60° C./16 hours$^A$ | 17 |
| SANTOPRENE ® 65 | TCDS | Dichloromethane | 0.05% | Styrene, neat | 60° C./16 hours$^A$ | 53 |

$^A$AIBN (0.01%) was added to the solution.

Example 5

Direct RAFT Polymerizations of Polystyrene Grafts on a Non-functionalized Polypropylene Substrate Polymer Using Various Concentrations of Control Agent

A 20 ml screw cap vial containing polypropylene discs (3 mm diameter, surface area 0.241 cm$^2$, 0.148 g) was charged with methanol (4.0 ml) and phenylethyl phenyldithioacetate (0.013 M in methanol, 3.0 ml, 0.040 mmol, 0.15 mol % Styrene). Styrene (3.0 ml, 26.2 mmol) was then added such that the concentration in solution was 30% v/v (2.62 M). Following this, the solution was degassed via passing nitrogen gas through for 5 min. The vial was then sealed and placed in the gamma irradiation chamber for 400 min (dose rate 1.53 kGy/h). The temperature within the chamber did not exceed 40° C. throughout the process. Following this, the supernatant liquid was decanted and replaced with dichloromethane. Agitation followed in order to dissolve the excess polystyrene formed. The washing solvent was changed periodically after this and agitation continued. After washing was complete, the samples were dried under vacuum. The mass recorded for the grafted discs was 0.190 g (28.4% increase).

A series of such RAFT polymerizations were conducted as above with varied concentrations of the RAFT control agent from 0.00 to 0.15 mol % Styrene. The outcomes are summarized in the bar chart shown as FIG. 1. It is evident from FIG. 1 that as the concentration of the RAFT control agent increased, the amount of grafted polystyrene decreased.

Example 6

Depth of Penetration of Grafts Using Surface Raman Micro-spectroscopy

The effect of the RAFT control agent concentration, phenylethyl phenyldithioacetate, on the depth of penetration of the styrene graft into the polypropylene substrate polymer was measured using Raman micro-spectroscopy. The Raman micro-spectroscopic depth profiling was performed using Surface Enhanced mode such that the illumination/scattering area from the substrate polymer surface was in the order of 1 micron in diameter. Grafted substrate polymer samples were sectioned, and then analyzed by collecting Raman spectra at 2 micron intervals from the outer edge of the sample towards the center. The analysis was discontinued when the acquired spectrum showed Raman peaks of the substrate polymer alone. From the series of acquired spectra, the intensity of selected Raman spectral peaks identified as corresponding to the vibrational modes of the substrate polymer and the graft, respectively, were scaled against each other to afford a plot profiling the depth of penetration of the polymer graft into the bulk substrate polymer.

Figure 2:
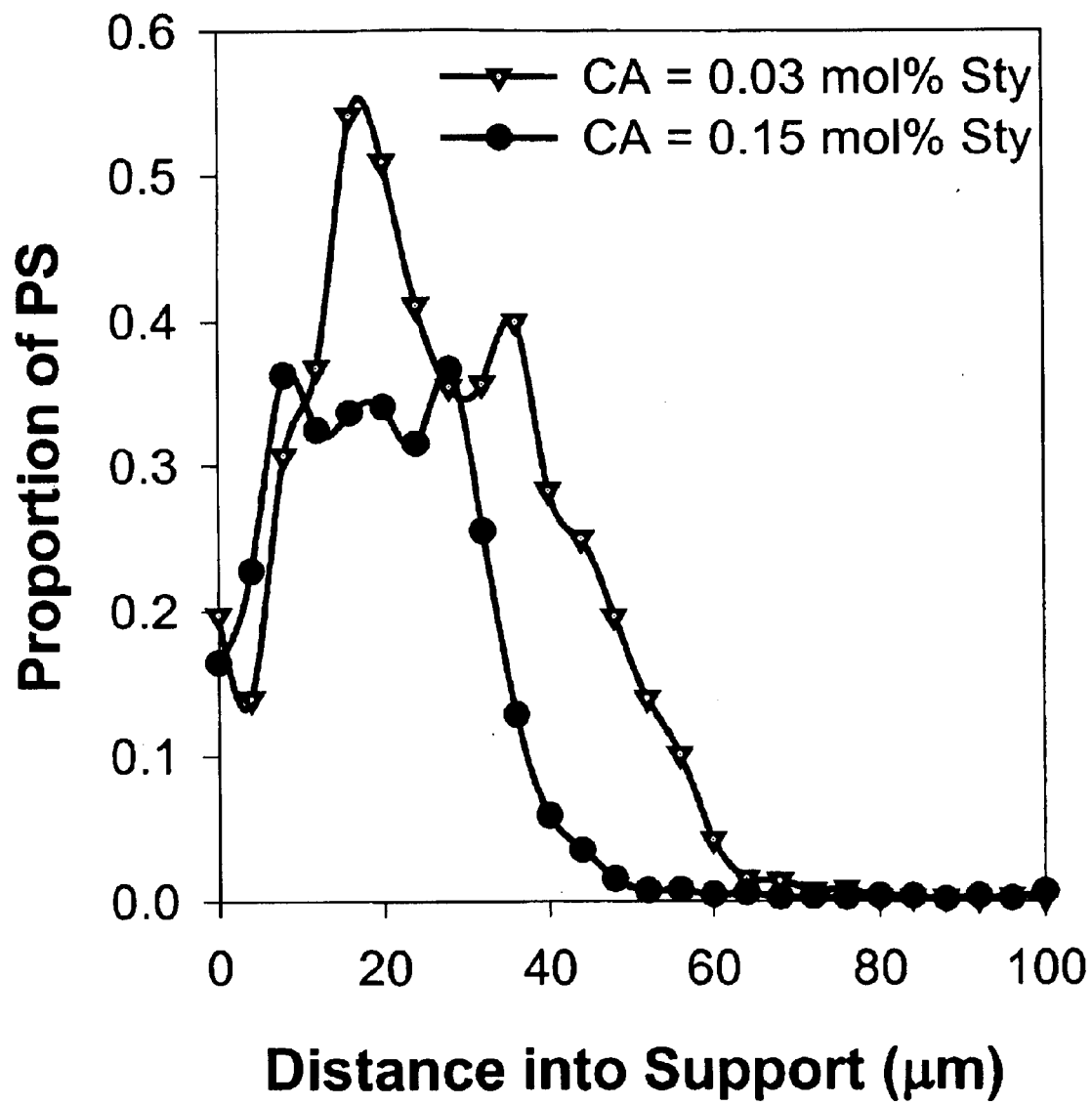
FIG. 2 is a graphical representation of the depth profile determined by Raman micro-spectroscopy of polystyrene grafts on a non-functionalized polypropylene substrate polymer at two different control agent concentrations.

For example, Raman peaks at 840 cm$^{-1}$ and 618 cm$^{-1}$ were used to plot the depth of penetration the polystyrene grafts on the polypropylene substrate, respectively. FIG. 2 shows two plots, one profiling penetration depth for grafts that polymerized on the substrate polymer at a control agent concentration of 0.03% and the other at a concentration of 0.15%. It is clear from the figure that the depth of penetration is substantially less (i.e., less in-growth) where the higher RAFT control agent concentration was used. The depth of penetration of the polystyrene graft for the higher concentration of control agent cut off at approximately 30–40 microns, whereas the grafts formed at lower concentration of control agent penetrated in to the solid substantially beyond approximately 50 microns, and even beyond 60 microns to some extent.

Example 7

Direct RAFT Polymerizations of Polystyrene Grafts on a Non-functionalized (Porous) Fluorinated Polymer Substrate Polymer Using Various Concentrations of Control Agent and Styrene Monomer

A 20 ml screw cap vial containing expanded (porous) fluoropolymer discs (5 mm diameter, 1.735 g) was charged with methanol (8.88 ml) and phenylethyl phenyldithioacetate (0.037 M in methanol, 0.12 ml, 0.004 mmol). Styrene (1.0 ml, 8.73 mmol) was then added such that the concentration in solution was 10% v/v (0.87 M). Following this, the solution was degassed via passing nitrogen gas through for 5 min. The vial was then sealed and placed in the gamma irradiation chamber for 400 min (dose rate 1.53 kGy/h). The temperature within the chamber did not exceed 40° C. throughout the process. Following this, the supernatant liquid was decanted and replaced with dichloromethane. Agitation followed in order to dissolve the excess polystyrene formed. The washing solvent was changed periodically after this and agitation continued. After washing was complete, the samples were dried under vacuum. The mass recorded for the grafted discs was 1.933 g (11.5% increase).

Figure 3:
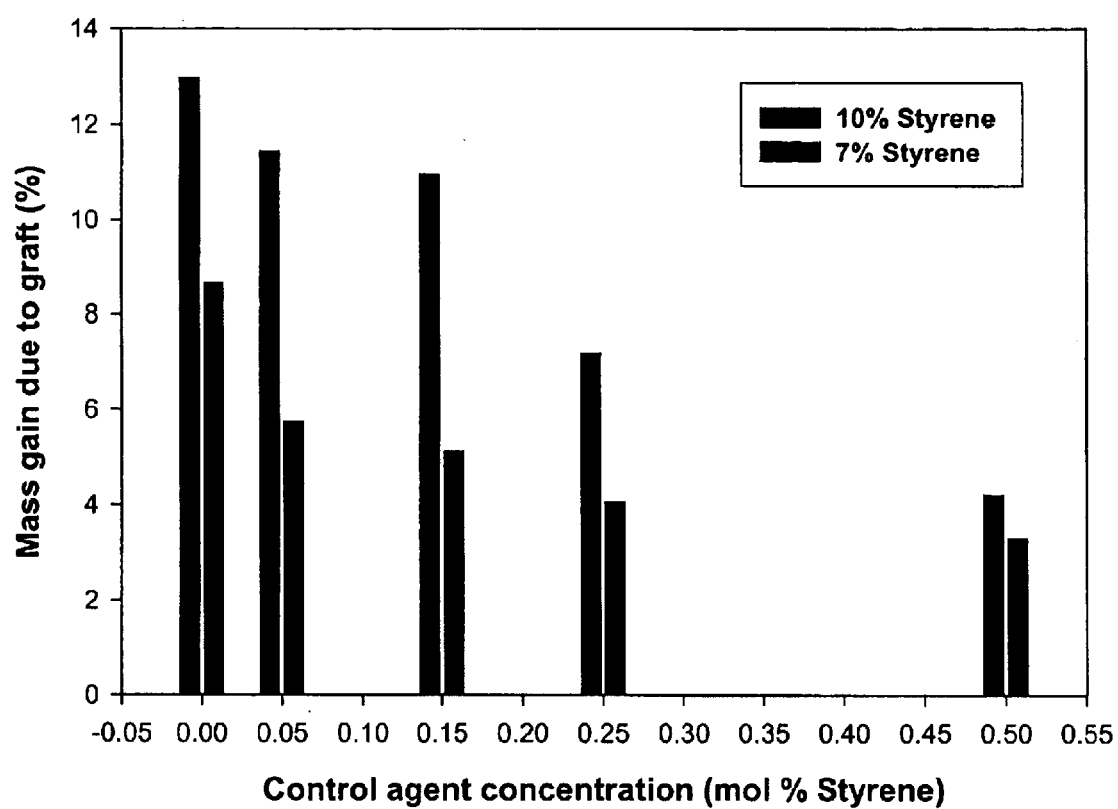
FIG. 3 is a graphical representation of substrate polymer mass increase versus control agent concentration for RAFT polymerization of polystyrene grafts on a non-functionalized porous fluorinated polymer.

A series of such RAFT polymerizations were conducted and the outcomes in terms of grafted mass increases are summarized in the bar chart shown as FIG. 3. In addition, a series of polymerizations were carried out using 7% styrene monomer concentration. As with the polyproplyene substrate polymer described in Example 5, FIG. 3 indicates that as the concentration of the RAFT control agent increased, the amount of polystyrene grafted to the fluorinated substrate polymer decreased. This trend also was observed using the lower concentration of monomer.

Example 8

Direct Polymerizations of Polystyrene Grafts on Polypropylene Substrate Polymers Using Various Concentrations of an ATRP Control Agent and Styrene Monomer A 20 ml screw cap vial containing molded polypropylene tubes (10 mm length, 3 mm diameter, 1.862 g) was charged with methanol (11.6 ml) and the "chain transfer" ATRP control agent, carbon tetrabromide ($CBr_4$, 0.03 M in methanol, 0.30 ml, 0.009 mmol). Styrene (2.1 ml, 18.3 mmol) was then added such that the concentration in solution was 25% v/v (2.18 M). Following this, the solution was degassed via passing nitrogen gas through for 5 min. The vial was then sealed and placed in the gamma irradiation chamber for 400 min (dose rate 1.53 kGy/h), after which the supernatant liquid was decanted and replaced with dichloromethane. Agitation followed in order to dissolve the excess polystyrene formed. The solvent was changed periodically after this and agitation continued. After washing was complete, the samples were dried under vacuum. The mass recorded for the grafted tubes was 1.910 g (3.7% increase).

Figure 4:
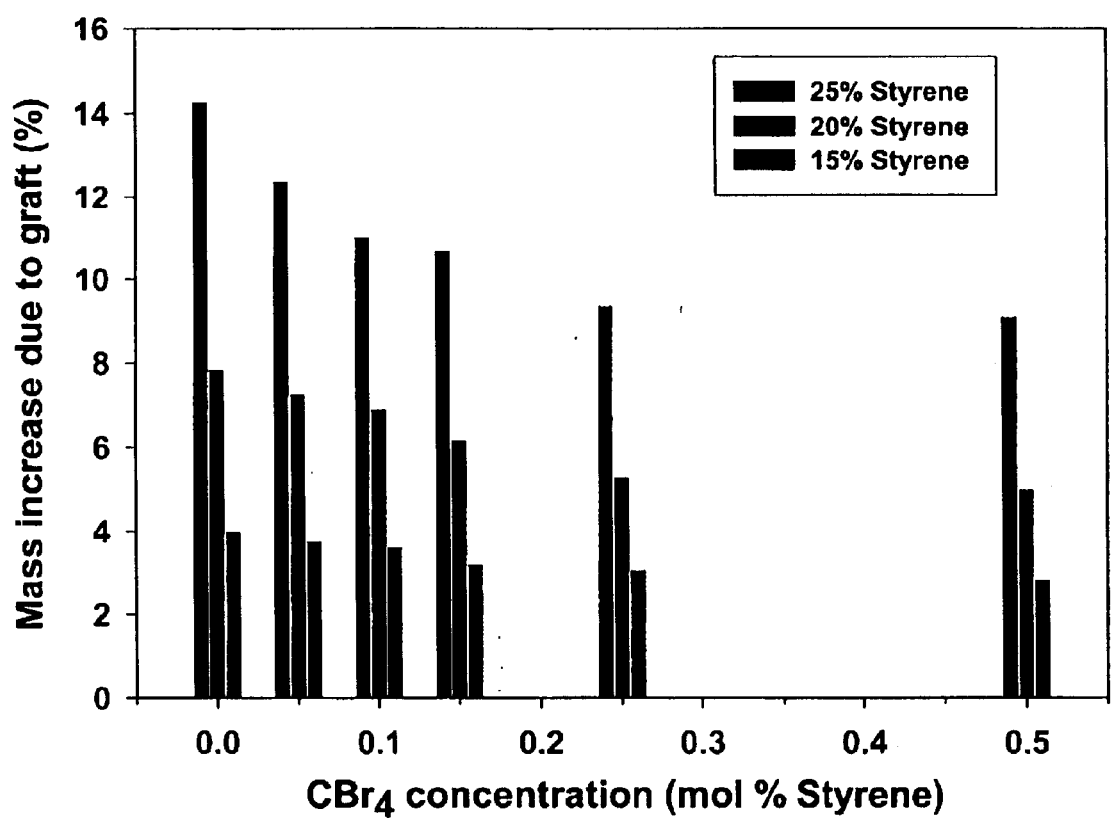
FIG. 4 is a graphical representation of substrate polymer mass increase versus control agent concentration for $CBr_4$ chain transfer polymerization of polystyrene grafts on molded polypropylene tubes.

A series of such polymerizations were conducted and the outcomes in terms of grafted mass increase are summarized in the bar chart shown as FIG. 4. It is evident from the FIG. 4 charts that as concentration of the chain transfer agent ($CBr_4$) increased, the amount of grafted polystyrene decreased. This trend was followed at all three concentrations of styrene monomer analyzed (i.e. 15, 20, and 25% monomer).

In addition, a series of such polymerizations were investigated and in-growth of the grafted polystyrene into the support material (polypropylene homopolymer) was studied by Raman micro-spectroscopy (as described in Example 6). It was found that increasing the concentration of the chain transfer agent ($CBr_4$) from 0.05 mole % styrene to 0.5 mole % styrene led to a decrease of the in-growth depth from 38 microns to 30 microns. In general, as concentration of the chain transfer agent ($CBr_4$) was increased, the depth of penetration into the base polyolefin decreased.

Example 9

Polymerization of Polystyrene-poly(methyl Methacrylate) (PS/PMMA) Block Copolymer Grafts on Polypropylene Substrate Polymer Via re-initiation of Polystyrene Grafts Capped with RAFT Control Agent A sealed 10 ml vial containing molded polypropylene tubes grafted with polystyrene in the presence of phenyl-ethyl phenyldithioacetate (10 mm length, 3 mm diameter, 0.271 g), prepared similarly to Example 5, was charged with methanol (4.00 ml), phenylethyl phenyldithioacetate (0.037 M in methanol, 0.36 ml, 0.013 mmol) and 2,2'-azobis(2-methylpropionitrile) (AIBN, 0.06 M in methanol, 0.14 ml, 0.009 mmol). Methyl methacrylate free of inhibitor (1.5 ml, 14.0 mmol) was then added such that the concentration in solution was 25% v/v (2.34 M). Following this, the solution was degassed via passing nitrogen gas through for 6 min. The vial was then placed in a heating unit at 60° C. with agitation for 18 hours, after which the supernatant liquid was decanted and replaced with dichloromethane. Agitation followed in order to dissolve the excess poly(methyl methacrylate) formed. The washing solvent was changed periodically after this and agitation continued. After washing was complete, the samples were dried under vacuum. The mass recorded for the re-initiated tubes was 0.282 g (4.4% increase).

Figure 5:
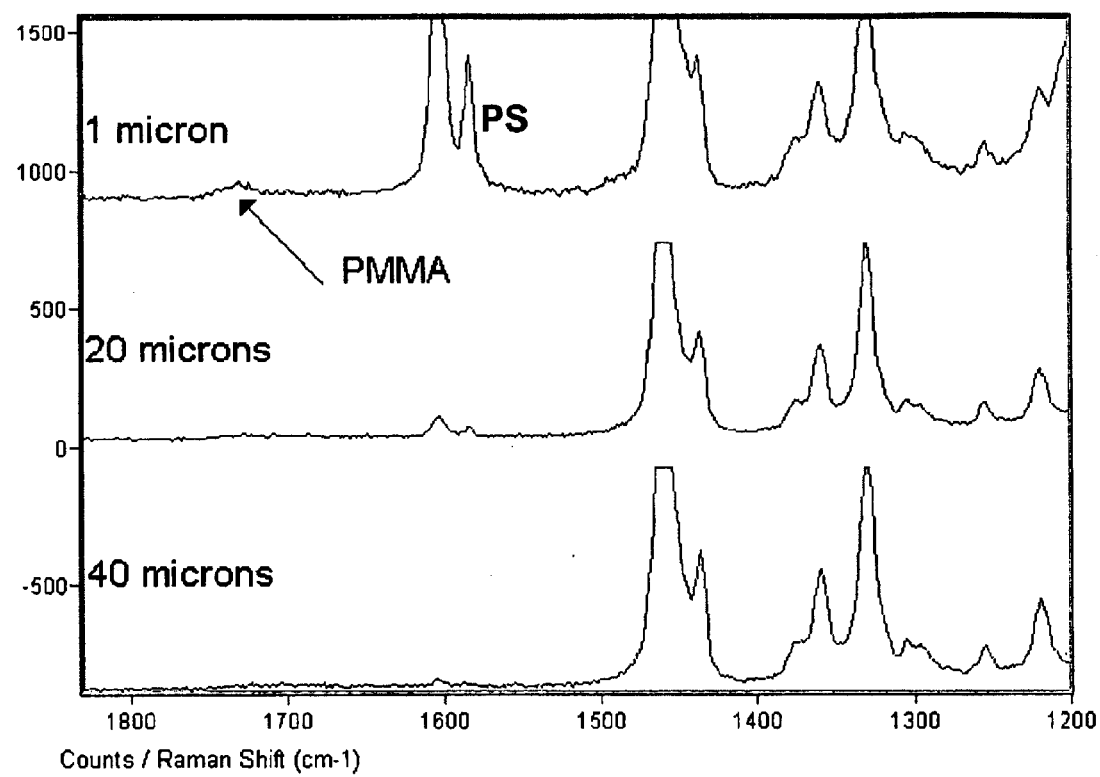
FIG. 5 shows Raman spectra obtained at three different depths of penetration of the polystyrene-poly(methyl methacrylate) (PS/PMMA) block copolymer grafts generated via re-initiation of polystyrene grafts on polypropylene substrate polymer capped with RAFT control agent.

Further, the tubes were examined for the presence of poly(methyl methacrylate) and its relative depth penetration using Raman spectroscopy. The Raman spectra are shown in FIG. 5. As illustrated by the Raman spectra shown in FIG. 5, the depth of penetration of the poly(methyl methacrylate) (PMMA) graft (as indicated by Raman peak at ~1725 $cm^{-1}$) is much less than that of the polystyrene graft from which the reaction was initiated (indicated by peaks at ~1600 $cm^{-1}$). Based on its low depth of penetration, it appears that the PMMA graft has been restricted to those polystyrene grafts at the surface regions of the substrate polymer.

Example 10

Polymerization of Polystyrene-poly(methyl Methacrylate) (PS/PMMA) Block Copolymer Grafts on Expanded (Porous)fluoropolymer Substrate Via re-initiation of Polystyrene Grafts Capped with Raft Control Agent A sealed 10 ml vial containing expanded (porous) fluoropolymer discs (5 mm diameter, 0.220 g) grafted with polystyrene in the presence of phenylethyl phenyldithioacetate, prepared in Example 6, was charged 8 ml of a solution consisting of inhibitor free methyl methacrylate (27.0 g, 269 mmol, 4.7 M) and 2,2'-azobis(2-methylpropionitrile) (AIBN, 0.10 g, 0.608 mmol, 0.01 M) in methanol. Following this, the solution was degassed via passing nitrogen gas through for 10 min. The vial was then placed in a heating unit at 60° C. with agitation for 16 hours, after which the excess poly(methyl methacrylate) formed was dissolved in dichloromethane with agitation.

Figure 6:
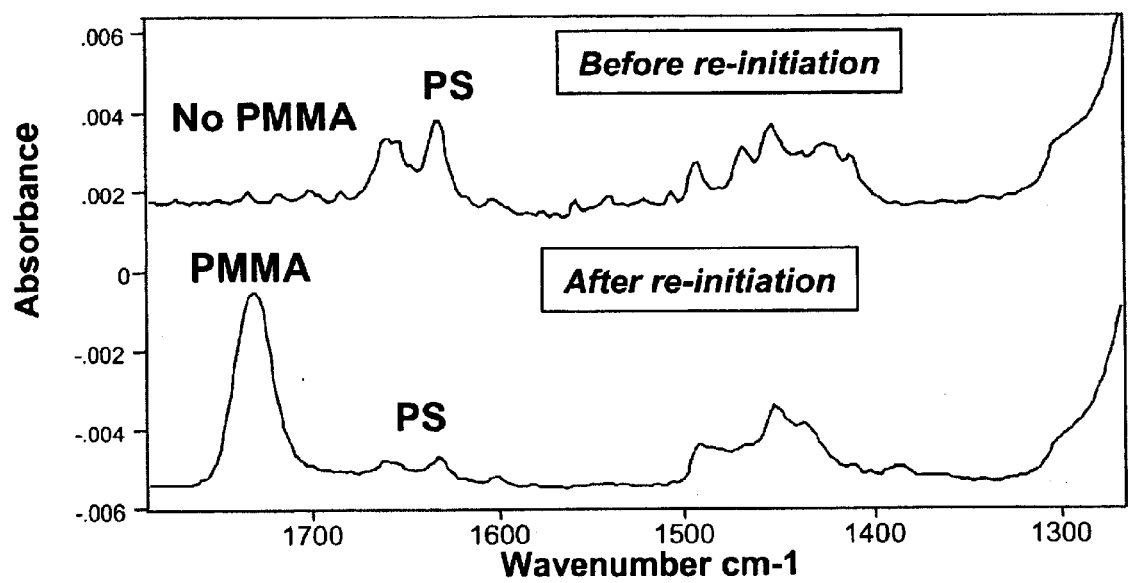
FIG. 6 shows ATR-IR spectra illustrating the generation of polystyrene-poly(methyl methacrylate) (PS/PMMA) block copolymer grafts via re-initiation of polystyrene grafts capped with RAFT control agent on an expanded (porous) fluoropolymer substrate. The top spectrum is of the grafted substrate polymer before the re-initiation reaction. The bottom spectrum is of the grafted substrate polymer after the re-initiation reaction and shows a signal indicating formation of PS/PMMA copolymer grafts.

The grafted substrate was then examined for the presence of poly(methyl methacrylate) on the surface using attenuated total reflectance (ATR) IR spectroscopy. The spectra (shown in FIG. 6) clearly show a peak at ~1725 $cm^{-1}$, indicating that a PMMA graft exists on the surface of the grafted fluoropolymer.

Example 11

Polymerization of Polystyrene-poly(methyl Methacrylate) (PS/PMMA) Block Copolymer Grafts on a Polypropylene Substrate Polymer Via re-initiation of Polystyrene Grafts Capped Using the ATRP Method A polymerization mixture was prepared comprising of benzyl bromide (0.855 g, 5 mmol), and 1.72 g, 2–2'dipyridyl ligand (11 mmol) dissolved in 100 g of inhibitor free methyl methacrylate monomer (1 mol). Then 10 ml of the polymerization mixture was added to a polymerization vial containing a weighed sample of grafted molded polypropylene tubes, prepared above in Example 8, and 0.050 g of the catalyst, copper (I) chloride (5 mmol). For comparison, a reference polymerization mixture (or blank) was concurrently prepared and exposed to the same conditions. The polymerization mixture and reference sample were degassed by nitrogen bubbling for 15 minutes. The surface ATRP initiation was carried out overnight at 90° C. in a temperature controlled oil bath. The grafted molded polypropylene tubes were recovered from the polymerized mixture by repeated washing with dichloromethane. The exhaustively washed samples were dried at 35° C. under vacuum for 24 hours before weighing. The samples exhibited a mass increase.

Example 12

Polymerization of a Polyethyl-α-hydroxymethacrylate Graft Using a RAFT Control Agent on a Grafted Co-Continuous Substrate Polymer a. Preparation of a co-continuous polymer formulation.

Phenyl magnesium bromide was prepared from bromobenzene (10.0 g, 63 mmol) and magnesium turnings (1.4 g, 58 mmol) in dry tetrahydrofuran (50 ml). The solution was warmed to 40° C. and carbon disulfide (4.5 g, 59 mmol) was added over 15 min whilst maintaining the reaction temperature of 40° C. To the resultant dark brown mixture was added hexakis(bromomethyl)benzene (5.0 g, 47 mmol) over 15 min. The reaction temperature was raised to 50° C. and maintained at that temperature for further 3 h. Ice water (200 ml) was added and the organic products were extracted with chloroform. The organic phase was washed with water (150 ml) and dried over anhydrous magnesium sulfate. After removal of the solvent, hexakis(thiobenzoyl thiomethyl) benzene was recrystallized from ethanol/chloroform. Hexakis(thiobenzoyl thiomethyl)benzene and styrene monomer were mixed together and degassed by bubbling nitrogen through the solution. The bottles were sealed and brought into an oil bath thermostated at 60° C., for 24 hours. The resultant star-like polymer was recovered by precipitation into methanol, to afford a white power of Mn 25662.

b. Grafting of the co-continuous formulation to a substrate polymer

A 10 mg/ml solution of polystyrene star polymer prepared above was dissolved in carbon disulphide. This solution was cast onto the surface of a polypropylene disc (ca. 5 mm diameter, 1 mm thick) at 20° C. in a controlled humid atmosphere (relative humidity of 90%) with a moist airflow directed over the surface of the disc. Once the macroporous film formation and drying were complete (about 5 minutes), the procedure was repeated on the opposing surface of the polypropylene disc.

c. Re-Initiation of polymerization to the co-continuous graft on the substrate polymer A bulk polymerization solution containing 0.018 g (0.066 mmol) of cumyl dithiobenzoate, 0.006 g (0.036 mmol) AIBN, 5 g (38.5 mmol) ethyl-α-hydroxymethacrylate and 5 g absolute ethanol was prepared in a 25 ml conical flask. Five macroporous discs prepared above were then added and, after sealing the vials with rubber septa, the solutions were degassed by bubbling with nitrogen gas for 30 minutes. The sample was heated at 60° C. in a temperature-controlled oil bath for 4 days to initiate the RAFT polymerization process both in the supernatant and from the accessible RAFT end groups on the macroporous surface.

After 4 days, the macroporous discs were removed from the polymerization solution and washed repeatedly over three days with absolute ethanol. The macroporous surfaces were then solubilized in deuterated chloroform and THF for NMR and GPC analysis, respectively. Both NMR and GPC revealed the presence of surface-initiated poly(ethyl-α-hydroxymethacrylate).

Example 13

Generation of a Substrate Polymer Modified with a Control Agent

A 30 ml screw cap vial containing polypropylene (square pieces of 0.8 mm thickness and 1.2 $cm^2$, 1.589 g) and fluoropolymer (discs of 0.5 cm in diameter and 1 mm in thickness) was sealed with a septum and the atmosphere removed by vacuum. The atmosphere was replaced with nitrogen and the process repeated 5 times. The sealed vial containing the polymers was then placed in the gamma irradiation chamber for 400 min at a dose rate of 1.53 kGy/h, after which a de-gassed solution of the control agent, phenylethyl phenyldithioacetate (0.003 M in isopropanol, 4.5 ml, 0.015 mmol) was added and the solution allowed to stand overnight.

Example 14

Controlled Polymerization of Polystyrene Grafts on a Substrate Polymer Previously Modified with a Control Agent Inhibitor free styrene (4.5 ml, 400 mmol), isopropanol (1.5 ml) and AIBN solution (0.003 M in isopropanol, 4.5 ml, 0.014 mmol) was then added to the yellow solution, and the mixture heated at 60° C. for 16 hours. After the reaction time, the polymer supports were removed from the vessel, washed extensively with dichloromethane and dried until constant weight was exhibited. Gravimetric analysis indicated a mass increase for the polypropylene and fluoropolymer samples of 24.0 and 2.8% respectively.

The class of fluorinated polymers used in this application was a TFE copolymer with a side chain consisting of PFA. The preferred level of copolymerization was 5–20% and the crystallinity of these classes of polymers was 20–45%. Fluoropolymers of the type described are commercially available under the trade names of FEP5100, PFA340, HPJ 420, THV 500, and PFA9935. In this example, FEP5100 was employed.

Example 15

Polymerization of Polystyrene Grafts in Selected Regions on a Substrate Polymer Via Enhancement of Radical Forming Means by Physical Stress A stainless steel probe is used as a physical stress means to create indentations or cavities in the surface of a polypropylene (e.g. 1.2 $cm^2$ square pieces of 0.8 mm thickness) or fluoropolymer (e.g. discs of 0.5 cm in diameter and 1 mm in thickness) substrate polymer, such as those described in Example 1. The physically treated substrate polymer sample is then placed in a 30 ml screw cap vial which is then charged with 4.0 ml methanol and 3.0 ml of a phenylethyl phenyldithioacetate solution (0.013 M in dichloromethane). Styrene monomer solution (3.0 ml, 26.2 mmol) is added such that the monomer concentration is 30% v/v (2.62 M)

and the concentration of the control agent, phenylethyl phenyldithioacetate is 0.15 mol % of the styrene monomer. This solution is degassed with nitrogen gas for 5 min, then sealed and placed in a gamma irradiation chamber for 400 min at a dose rate 1.53 kGy/h. After irradiation the supernatant liquid is decanted and replaced with dichloromethane. The solution is then agitated in order to dissolve excess soluble polystyrene, decanted again and this washing with dichloromethane is repeated several times. After washing is complete, the substrate polymer samples are removed and dried under vacuum.

The polymerization of polystyrene grafts on the substrate polymer surface may be visualized e.g. by aminomethylation of the samples followed by development with 0. 1% bromophenol blue stain in THF. (Aminomethylation may be achieved by e.g. treatment with N-(hydroxymethyl) phthalimide in the presence of methanesulfonic acid in dry DCM solution containing 20% TFA). Analysis of the intensity of staining of the substrate polymer surface should indicate that the polymerization of the polystyrene grafts is enhanced in the cavity regions on the surface created by the physical stress means of the stainless steel probe.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

What is claimed is:

1. A method for generating a substrate polymer useful for graft polymerization comprising:
   (a) providing a substrate polymer comprising a surface;
   (b) subjecting the substrate polymer to a radical-forming agent to generate radicals on the surface or a sub-surface of the substrate polymer; and
   (c) contacting the substrate polymer with a control agent; whereby the control agent reacts with the generated radicals, or radicals generated therefrom, to modify the surface of the substrate polymer.

2. The method of claim 1 wherein the substrate polymer is selected from the group of polymers consisting of: polyalkenes; substituted acrylic polymers; vinyl halide polymers; polyvinylethers; polyvinylesters; silicone polymers; natural or synthetic rubber; polyurethane; polyamide; polyester; formaldehyde resin; polycarbonate; polyoxymethylene; polyether; and epoxy resin.

3. The method of claim 1 wherein the substrate polymer has physical characteristics comprising: a Hardness Shore "D" of from about 60 to about 80; a Flexural Modulus Value of from about 600 to about 2000 Mpa; an Impact Strength Value of from about 4 to about 20 $kJ/m^2$ at 23° C.; a crystallinity level of from about 10 to about 70%; and a Melt Flow Index of from about 1 to about 30.

4. The method of claim 1 wherein the substrate polymer is polypropylene.

5. The method of claim 1 wherein the substrate polymer has a co-continuous architecture.

6. The method of claim 1 wherein the substrate polymer is macroporous.

7. The method of claim 1 wherein the control agent is selected from the group consisting of: RAFT control agents; ATRP control agents; and nitroxide control agents.

8. The method of claim 1 wherein the control agent is a RAFT control agent selected from the list consisting of: 1-phenylprop-2-yl phenyldithioacetate; 1-phenylethyl phenyldithioacetate, cumyl phenylditioacetate, 2-phenylprop-2-yl dithiobenzoate; 1-phenylprop-2-yl p-bromodithiobenzoate; 1-phenylethyl dithiobenzoate; 2-cyanoprop-2-yl dithiobenzoate; 4-cyanopentanoic acid dithiobenzoate; 1-acetoxyethyl dithiobenzoate; hexakis (thiobenzoylthiomethyl)benzene; 1,4-bis (thiobenzoylthiomethyl)benzene; 1,2,4,5-tetrakis (thiobenzoylthiomethyl)benzene; ethoxycarbonylmethyl dithioacetate; 2-(ethoxycarbonyl)prop-2-yl dithiobenzoate; tert-butyl dithiobenzoate; 1,4-bis(2-thiobenzoylthioprop-2-yl)benzene; 4-cyano-4-(thiobenzoylthio)pentanoic acid; dibenzyl trithiocarbonate; carboxymethyl dithiobenzoate; s-benzyl diethoxyphosphinyldothioformate; 2,4,4-trimethylpent-2-yl dithiobenzoate; 2-(ethoxycarboxyl)prop-2-yl dithiobenzoate; 2-phenylprop-2-yl 1-dithionaphthalate; 2-phenylprop-2-yl 4-chlorodithiobenzoate.

9. The method of claim 1 wherein the control agent is an ATRP control agent selected from the list consisting of:
   CuX, wherein X=Br, Cl, I, and the other Cu ligands are selected from the list comprising: 4,4'-di(5-nonyl)-2,2'-bipyridine; 2,2'-bipyridine, N-alkyl-2-pyridylmethanimine (N-propyl, N-pentyl, N-butyl); N,N,N',N'',N''-pentamethyldiethylenetriamine; N,N,N'',N''',N'''-hexamethyltriethylenetetraamine; and tris-(2-(dimethylamino)ethyl)amine; Fe(cyclopentadienyl) $(CO)_2I$; $Ti(OiPr)_4$; Ru(pentamethylcyclopentadienyl) $Cl(PPh_3)_2$; $Ru(cyclopentadienyl)Cl(PPh_3)_2$; $Ru(indenyl)Cl(PPh_3)_2$; and $CBr_4$.

10. The method of claim 1 wherein the radical-forming agent is selected from the group consisting of exposure to particle radiation; exposure to plasma discharge radiation; exposure to ionizing radiation including γ-irradiation, electron beam radiation, X-rays; exposure to electromagnetic radiation including radiation in the UV, visible, infrared and microwave spectrum; exposure to high or low levels of temperature; and exposure to chemical agents that induce hydrogen abstraction and radical propagation.

11. The method of claim 1 wherein the radical-forming agent comprises gamma-radiation.

12. A solid support modified with a control agent for use in controlled polymerization made by the method of claim 1.

13. A method for generating a substrate polymer with a plurality of surface regions useful for graft polymerization comprising:
   (a) providing a substrate polymer comprising a surface;
   (b) subjecting a first region of the surface of the substrate polymer to a radical-forming agent to generate radicals on the surface or a sub-surface of the first region;
   (c) contacting the substrate polymer with a first control agent;
   (d) subjecting at least a second region of the surface of the substrate polymer to a radical-forming agent to generate radicals on the surface or a sub-surface of the at least second region; and
   (e) contacting the substrate polymer with at least a second control agent;
whereby the first and at least second control agents respectively react with the generated radical, or radicals generated therefrom, on the first and the at least second regions to modify the surface of the substrate polymer.

14. The method of claim 13 wherein the at least two regions of the substrate polymer are modified with different control agents.

15. The method of claim 14 wherein the different control agents require different conditions in order to promote controlled polymerization.

16. The method of claim 15 wherein the different conditions in order to promote controlled polymerization are orthogonal.

17. The method of claim 13 wherein the substrate polymer is selected from the group of polymers consisting of polyalkenes; substituted acrylic polymers; vinyl halide polymers; polyvinylethers; polyvinylesters; silicone polymers; natural or synthetic rubber; polyurethane; polyamide; polyester; formaldehyde resin; polycarbonate; polyoxymethylene; polyether; and epoxy resin.

18. The method of claim 13 wherein the substrate polymer has physical characteristics comprising: a Hardness Shore "D" of from about 60 to about 80; a Flexural Modulus Value of from about 600 to about 2000 Mpa; an Impact Strength Value of from about 4 to about 20 kJ/m$^2$ at 23° C.; a crystallinity level of from about 10 to about 70%; and a Melt Flow Index of from about 1 to about 30.

19. The method of claim 13 wherein the substrate polymer is polypropylene.

20. The method of claim 13 wherein the substrate polymer has a co-continuous architecture.

21. The method of claim 13 wherein the substrate polymer is macroporous.

22. The method of claim 13 wherein the control agent is selected from the group consisting of: RAFT control agents; ATRP control agents; and nitroxide control agents.

23. The method of claim 13 wherein the control agent is a RAFT control agent selected from the list consisting of: 1-phenylprop-2-yl phenyldithioacetate; 1-phenylethyl phenyldithioacetate, cumyl phenylditioacetate, 2-phenylprop-2-yl dithiobenzoate; 1-phenylprop-2-yl p-bromodithiobenzoate; 1-phenylethyl dithiobenzoate; 2-cyanoprop-2-yl dithiobenzoate; 4-cyanopentanoic acid dithiobenzoate; 1-acetoxyethyl dithiobenzoate; hexakis (thiobenzoylthiomethyl)benzene; 1,4-bis (thiobenzoylthiomethyl)benzene; 1,2,4,5-tetrakis (thiobenzoylthiomethyl)benzene; ethoxycarbonylmethyl dithioacetate; 2-(ethoxycarbonyl)prop-2-yl dithiobenzoate; tert-butyl dithiobenzoate; 1,4-bis(2-thiobenzoylthioprop-2-yl)benzene; 4-cyano-4-(thiobenzoylthio)pentanoic acid; dibenzyl trithiocarbonate; carboxymethyl dithiobenzoate; s-benzyl diethoxyphosphinyldothioformate; 2,4,4-trimethylpent-2-yl dithiobenzoate; 2-(ethoxycarboxyl)prop-2-yl dithiobenzoate; 2-phenylprop-2-yl 1-dithionaphthalate; 2-phenylprop-2-yl 4-chlorodithiobenzoate.

24. The method of claim 13 wherein the control agent is an ATRP control agent selected from the list consisting of:
CuX, wherein X=Br, Cl, I, and the other Cu ligands are selected from the list comprising: 4,4'-di(5-nonyl)-2,2'-bipyridine; 2,2'-bipyridine, N-alkyl-2-pyridylmethanimine (N-propyl, N-pentyl, N-butyl); N,N,N',N'',N''-pentamethyldiethylenetriamine; N,N, N'',N''',N'''-hexamethyltriethylenetetraamine; and tris-(2-(dimethylamino)ethyl)amine; Fe(cyclopentadienyl)(CO)$_2$I; Ti(OiPr)$_4$; Ru(pentamethylcyclopentadienyl)Cl(PPh$_3$)$_2$; Ru(cyclopentadienyl)Cl(PPh$_3$)$_2$; Ru(indenyl)Cl(PPh$_3$)$_2$; and CBr$_4$.

25. The method of claim 13 wherein the radical-forming agent is selected from the group consisting of exposure to particle radiation; exposure to plasma discharge radiation; exposure to ionizing radiation including γ-irradiation, electron beam radiation, X-rays; exposure to electromagnetic radiation including radiation in the UV, visible, infrared and microwave spectrum; exposure to high or low levels of temperature; and exposure to chemical agents that induce hydrogen abstraction and radical propagation.

26. The method of claim 13 wherein the radical-forming agent comprises gamma-radiation.

27. A substrate polymer with a plurality of surface regions useful for graft polymerization made by the method of claim 13.

28. A substrate polymer with a plurality of surface regions useful for graft polymerization made by the method of claim 14.

29. A substrate polymer with a plurality of surface regions useful for graft polymerization made by the method of claim 15.

30. A method for generating a substrate polymer with a plurality of surface regions useful for graft polymerization comprising:
(a) providing a substrate polymer comprising a surface;
(b) subjecting a first region of the surface of the substrate polymer to a physical stress means;
(c) subjecting the first region of the surface of the substrate polymer to a radical-forming agent to generate radicals on the surface or a sub-surface of the first region;
(d) contacting the substrate polymer with a first control agent;
(e) subjecting at least a second region of the surface of the substrate polymer to a physical stress means;
(f) subjecting the at least second region of the surface of the substrate polymer to a radical-forming agent to generate radicals on the surface or a sub-surface of the at least second region; and
(g) contacting the substrate polymer with at least a second control agent;
whereby the first and at least second control agents respectively react with the generated radicals, or radicals generated therefrom, on the first and the at least second regions to modify the surface of the substrate polymer.

31. The method of claim 30 wherein the at least two regions of the substrate polymer are modified with different control agents.

32. The method of claim 31 wherein the different control agents require different conditions in order to promote controlled polymerization.

33. The method of claim 32 wherein the different conditions in order to promote controlled polymerization are orthogonal.

34. The method of claim 30 wherein the substrate polymer is selected from the group of polymers consisting of polyalkenes; substituted acrylic polymers; vinyl halide polymers; polyvinylethers; polyvinylesters; silicone polymers; natural or synthetic rubber; polyurethane; polyamide; polyester; formaldehyde resin; polycarbonate; polyoxymethylene; polyether; and epoxy resin.

35. The method of claim 30 wherein the substrate polymer has physical characteristics comprising: a Hardness Shore "D" of from about 60 to about 80; a Flexural Modulus Value of from about 600 to about 2000 Mpa; an Impact Strength Value of from about 4 to about 20 kJ/m$^2$ at 23° C.; a crystallinity level of from about 10 to about 70%; and a Melt Flow Index of from about 1 to about 30.

36. The method of claim 30 wherein the substrate polymer is polypropylene.

37. The method of claim 30 wherein the substrate polymer has a co-continuous architecture.

38. The method of claim 30 wherein the substrate polymer is macroporous.

39. The method of claim 30 wherein the control agent is selected from the group consisting of: RAFT control agents; ATRP control agents; and nitroxide control agents.

40. The method of claim 30 wherein the control agent is a RAFT control agent selected from the list consisting of 1-phenylprop-2-yl phenyldithioacetate; 1-phenylethyl phenyldithioacetate, cumyl phenylditioacetate, 2-phenylprop-2-yl dithiobenzoate; 1-phenylprop-2-yl p-bromodithiobenzoate; 1-phenylethyl dithiobenzoate; 2-cyanoprop-2-yl dithiobenzoate; 4-cyanopentanoic acid dithiobenzoate; 1-acetoxyethyl dithiobenzoate; hexakis(thiobenzoylthiomethyl)benzene; 1,4-bis(thiobenzoylthiomethyl)benzene; 1,2,4,5-tetrakis(thiobenzoylthiomethyl)benzene; ethoxycarbonylmethyl dithioacetate; 2-(ethoxycarbonyl)prop-2-yl dithiobenzoate; tert-butyl dithiobenzoate; 1,4-bis(2-thiobenzoylthioprop-2-yl)benzene; 4-cyano-4-(thiobenzoylthio)pentanoic acid; dibenzyl trithiocarbonate; carboxymethyl dithiobenzoate; s-benzyl diethoxyphosphinyldothioformate; 2,4,4-trimethylpent-2-yl dithiobenzoate; 2-(ethoxycarboxyl)prop-2-yl dithiobenzoate; 2-phenylprop-2-yl 1-dithionaphthalate; 2-phenylprop-2-yl 4-chlorodithiobenzoate.

41. The method of claim 30 wherein the control agent is an ATRP control agent selected from the list consisting of:

CuX, wherein X=Br, Cl, I, and the other Cu ligands are selected from the list comprising 4,4'-di(5-nonyl)-2,2'-bipyridine; 2,2'-bipyridine, N-alkyl-2-pyridylmethanimine (N-propyl, N-pentyl, N-butyl); N,N,N',N'',N''-pentamethyldiethylenetriamine; N,N,N'',N''',N'''-hexamethyltriethylenetetraamine; and tris-(2-(dimethylamino)ethyl)amine; Fe(cyclopentadienyl)(CO)$_2$I; Ti(OiPr)$_4$; Ru(pentamethylcyclopentadienyl)Cl(PPh$_3$)$_2$; Ru(cyclopentadienyl)Cl(PPh$_3$)$_2$; Ru(indenyl)Cl(PPh$_3$)$_2$; and CBr$_4$.

42. The method of claim 30 wherein the radical-forming agent is selected from the group consisting of: exposure to particle radiation; exposure to plasma discharge radiation; exposure to ionizing radiation including gamma-irradiation, electron beam radiation, X-rays; exposure to electromagnetic radiation including radiation in the UV, visible, infrared and microwave spectrum; exposure to high or low levels of temperature; and exposure to chemical agents that induce hydrogen abstraction and radical propagation.

43. The method of claim 30 wherein the radical-forming agent comprises gamma-radiation.

44. A substrate polymer with a plurality of surface regions useful for graft polymerization made by the method of claim 30.

45. A method of graft polymerization comprising:

(a) providing a substrate polymer comprising a surface;

(b) subjecting the substrate polymer to a radical-forming agent to generate radicals on the surface or a sub-surface of the substrate polymer; and (c) contacting the substrate polymer with a solution comprising monomer, and a control agent;

whereby the control agent reacts with the generated radicals, or radicals generated therefrom, and controlled polymerization of said monomer occurs resulting in a graft polymer on the surface of the substrate polymer.

46. The method of claim 45 comprising the further step of:

(d) contacting the substrate polymer with at least a second solution comprising a second monomer and a control agent;

whereby controlled polymerization of said second monomer occurs from the end of the graft polymer on the surface resulting in a copolymer graft on the substrate polymer.

47. The method of claim 45 wherein the substrate polymer is selected from the group of polymers consisting of: polyalkenes; substituted acrylic polymers; vinyl halide polymers; polyvinylethers; polyvinylesters; silicone polymers; natural or synthetic rubber; polyurethane; polyamide; polyester; formaldehyde resin; polycarbonate; polyoxymethylene; polyether; and epoxy resin.

48. The method of claim 45 wherein the substrate polymer has physical characteristics comprising: a Hardness Shore "D" of from about 60 to about 80; a Flexural Modulus Value of from about 600 to about 2000 Mpa; an Impact Strength Value of from about 4 to about 20 kJ/m$^2$ at 23° C.; a crystallinity level of from about 10 to about 70%; and a Melt Flow Index of from about 1 to about 30.

49. The method of claim 45 wherein the substrate polymer is polypropylene.

50. The method of claim 45 wherein the substrate polymer has a co-continuous architecture.

51. The method of claim 45 wherein the substrate polymer is macroporous.

52. The method of claim 45 wherein the control agent is selected from the group consisting of: RAFT control agents; ATRP control agents; and nitroxide control agents.

53. The method of claim 45 wherein the control agent is a RAFT control agent selected from the list consisting of 1-phenylprop-2-yl phenyldithioacetate; 1-phenylethyl phenyldithioacetate, cumyl phenylditioacetate, 2-phenylprop-2-yl dithiobenzoate; 1-phenylprop-2-yl p-bromodithiobenzoate; 1-phenylethyl dithiobenzoate; 2-cyanoprop-2-yl dithiobenzoate; 4-cyanopentanoic acid dithiobenzoate; 1-acetoxyethyl dithiobenzoate; hexakis(thiobenzoylthiomethyl)benzene; 1,4-bis(thiobenzoylthiomethyl)benzene; 1,2,4,5-tetrakis(thiobenzoylthiomethyl)benzene; ethoxycarbonylmethyl dithioacetate; 2-(ethoxycarbonyl)prop-2-yl dithiobenzoate; tert-butyl dithiobenzoate; 1,4-bis(2-thiobenzoylthioprop-2-yl)benzene; 4-cyano-4-(thiobenzoylthio)pentanoic acid; dibenzyl trithiocarbonate; carboxymethyl dithiobenzoate; s-benzyl diethoxyphosphinyldothioformate; 2,4,4-trimethylpent-2-yl dithiobenzoate; 2-(ethoxycarbonyl)prop-2-yl dithiobenzoate; 2-phenylprop-2-yl 1-dithionaphthalate; 2-phenylprop-2-yl 4-chlorodithiobenzoate.

54. The method of claim 45 wherein the control agent is an ATRP control agent selected from the list consisting of:

CuX, wherein X=Br, Cl, I, and the other Cu ligands are selected from the list comprising 4,4'-di(5-nonyl)-2,2'-bipyridine; 2,2'-bipyridine, N-alkyl-2-pyridylmethanimine (N-propyl, N-pentyl, N-butyl); N,N,N',N'',N''-pentamethyldiethylenetriamine; N,N,N'',N''',N'''-hexamethyltriethylenetetraamine; and tris-(2-(dimethylamino)ethyl)amine; Fe(cyclopentadienyl)(CO)$_2$I; Ti(OiPr)$_4$; Ru(pentamethylcyclopentadienyl)Cl(PPh$_3$)$_2$; Ru(cyclopentadienyl)Cl(PPh$_3$)$_2$; Ru(indenyl)Cl(PPh$_3$)$_2$; and CBr$_4$.

55. The method of claim 45 wherein the concentration of control agent in the solution is between about 0.001 mol % and 1 mol % of monomer concentration.

56. The method of claim 45 wherein the concentration of control agent in the solution is between about 0.001 mol % and 0.3 mol % of monomer concentration.

57. The method of claim 45 wherein the concentration of control agent in the solution is between about 0.1 mol % and 0.3 mol % of monomer concentration.

58. The method of claim 45 wherein the monomer is selected from the group consisting of: methyl methacrylate, ethyl methacrylate, propyl methacrylate (all isomers), butyl methacrylate (all isomers), 2-ethylhexyl methacrylate, ethyl-α-hydroxymethacrylate, isobromyl methacrylate, methacrylic acid, benzyl methacrylate, phenyl methacrylate, tetrahydrofurfural methacrylate, methacrylonitrile, alpha-methylstyrene, methyl acrylate, ethyl acrylate, propyl acrylate (all isomers), butyl acrylate (all isomers), 2-ethylhexyl acrylate, isobromyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, ethacrylamide, N-methylacrylamide, N,N-dimethylacrylamide, N-tertbutylmethacrylamide, N-n-butylmethacrylamide, N-methylohnethacrylamide, N-ethylolmethacrylamide, N-tert-butylacrylamide, N-n-butylacrylamide, N-methylolacrylamide, N-ethylolacrylamide, vinylbenzoic acid (all isomers), diethylaminostyrene (all isomers), alpha-methylvinyl benzoic acid (all isomers), diethylamino alpha-methylstyrene (all isomers), p-vinylbenzene sulfonic acid, p-vinylbenzene sulfonic and sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, 3-isopropenyl-a,a-dimethylbenzyl isocyanate, N-vinylpyrrolidone, N-vinylcarbazole, butadiene, isoprene, chloroprene, ethylene and propylene.

59. The method of claim 45 wherein the monomer is oligomeric.

60. The method of claim 45 wherein the monomer is macromeric.

61. The method of claim 45 wherein the concentration of monomer in the solution is between about 5 volume % and 40 volume %.

62. The method of claim 45 wherein the concentration of monomer in the solution is between about 10 volume % and 25 volume %.

63. The method of claim 45 wherein the concentration of monomer in the solution is between about 10 volume % and 15 volume %.

64. The method of claim 45 wherein the radical-forming agent is selected from the group consisting of: exposure to particle radiation; exposure to plasma discharge radiation; exposure to ionizing radiation including gamma-irradiation, electron beam radiation, X-rays; exposure to electromagnetic radiation including radiation in the UV, visible, infrared and microwave spectrum; exposure to high or low levels of temperature; and exposure to chemical agents that induce hydrogen abstraction and radical propagation.

65. The method of claim 45 wherein the radical-forming agent comprises gamma-radiation.

66. A substrate polymer with a graft polymer attached to its surface made by the method of claim 45.

67. A substrate polymer with a graft co-polymer attached to its surface made by the method claim 46.

68. A substrate polymer with a graft polymer attached to its surface made by the method of claim 45 wherein the graft polymer has a depth of penetration into the substrate polymer surface less than about 80 $\mu$m.

69. A substrate polymer with a graft polymer attached to its surface made by the method of claim 45 wherein the graft polymer has a depth of penetration into the substrate polymer surface less than about 60 $\mu$m.

70. A substrate polymer with a graft polymer attached to its surface made by the method of claim 45 wherein the graft polymer has a depth of penetration into the substrate polymer surface less than about 40 $\mu$m.

71. A method of generating polymer grafts at a plurality of regions on the surface of a substrate polymer comprising:
(a) providing a substrate polymer comprising a surface;
(b) subjecting a first region of the surface of the substrate polymer to a physical stress means;
(c) subjecting the first region of the surface of the substrate polymer to a radical-forming agent to generate radicals on the surface or a sub-surface of the first region;
(d) contacting the substrate polymer with a first solution comprising a monomer, and a first control agent;
(e) subjecting at least a second region of the surface of the substrate polymer to a physical stress means;
(f) subjecting the at least a second region of the surface of the substrate polymer to a radical-forming agent to generate radicals on the surface or a sub-surface of the at least second region; and
(g) contacting the substrate polymer with at least a second solution comprising a second monomer, and a second control agent;
whereby the first and the at least second control agents respectively react with the generated radicals, or radicals generated therefrom, on the first and the at least second regions, and controlled polymerisation of the monomers occurs resulting in a graft polymer on the first and the at least second regions of the surface of the substrate polymer.

72. The method of claim 71 wherein the substrate polymer is selected from the group of polymers consisting of: polyalkenes; substituted acrylic polymers; vinyl halide polymers; polyvinylethers; polyvinylesters; silicone polymers; natural or synthetic rubber; polyurethane; polyamide; polyester; formaldehyde resin; polycarbonate; polyoxymethylene; polyether; and epoxy resin.

73. The method of claim 71 wherein the substrate polymer has physical characteristics comprising a Hardness Shore "D" of from about 60 to about 80; a Flexural Modulus Value of from about 600 to about 2000 Mpa; an Impact Strength Value of from about 4 to about 20 kJ/m$^2$ at 23° C.; a crystallinity level of from about 10 to about 70%; and a Melt Flow Index of from about 1 to about 30.

74. The method of claim 71 wherein the substrate polymer is polypropylene.

75. The method of claim 71 wherein the substrate polymer has a co-continuous architecture.

76. The method of claim 71 wherein the substrate polymer is macroporous.

77. The method of claim 71 wherein the control agent is selected from the group consisting of: RAFT control agents; ATRP control agents; and nitroxide control agents.

78. The method of claim 71 wherein the control agent is a RAFT control agent selected from the list consisting of 1-phenylprop-2-yl phenyldithioacetate; 1-phenylethyl phenyldithioacetate, cumyl phenylditioacetate, 2-phenylprop-2-yl dithiobenzoate; 1-phenylprop-2-yl p-bromodithiobenzoate; 1-phenylethyl dithiobenzoate; 2-cyanoprop-2-yl dithiobenzoate; 4-cyanopentanoic acid dithiobenzoate; 1-acetoxyethyl dithiobenzoate; hexakis (thiobenzoylthiomethyl)benzene; 1,4-bis (thiobenzoylthiomethyl)benzene; 1,2,4,5-tetrakis (thiobenzoylthiomethyl)benzene; ethoxycarbonylmethyl dithioacetate; 2-(ethoxycarbonyl)prop-2-yl dithiobenzoate; tert-butyl dithiobenzoate; 1,4-bis(2-thiobenzoylthioprop-2-yl)benzene; 4-cyano-4-(thiobenzoylthio)pentanoic acid; dibenzyl trithiocarbonate; carboxymethyl dithiobenzoate; s-benzyl diethoxyphosphinyldothioformate; 2,4,4-trimethylpent-2-yl dithiobenzoate; 2-(ethoxycarbonyl)prop-2-yl dithiobenzoate; 2-phenylprop-2-yl 1-dithionaphthalate; 2-phenylprop-2-yl 4-chlorodithiobenzoate.

79. The method of claim 71 wherein the control agent is an ATRP control agent selected from the list consisting of:
CuX, wherein X=Br, Cl, I, and the other Cu ligands are selected from the list comprising: 4,4'-di(5-nonyl)-2,2'-bipyridine; 2,2'-bipyridine, N-alkyl-2-pyridylmethanimine (N-propyl, N-pentyl, N-butyl); N,N,N',N'',N''-pentamethyldiethylenetriamine; N,N,N'',N''',N'''-hexamethyltriethylenetetraamine; and tris-(2-(dimethylamino)ethyl)amine; Fe(cyclopentadienyl)(CO)$_2$I; Ti(OiPr)$_4$; Ru(pentamethylcyclopentadienyl)Cl(PPh$_3$)$_2$; Ru(cyclopentadienyl)Cl(PPh$_3$)$_2$; Ru(indenyl)Cl(PPh$_3$)$_2$; and CBr$_4$.

80. The method of claim 71 wherein the concentration of control agent in the first and/or second solution is between about 0.001 mol % and 1 mol % of monomer concentration.

81. The method of claim 71 wherein the concentration of control agent in the first and/or second solution is between about 0.001 mol % and 0.3 mol % of monomer concentration.

82. The method of claim 71 wherein the concentration of control agent in the first and/or second solution is between about 0.1 mol % and 0.3 mol % of monomer concentration.

83. The method of claim 71 wherein the monomer is selected from the group consisting of: methyl methacrylate, ethyl methacrylate, propyl methacrylate (all isomers), butyl methacrylate (all isomers), 2-ethylhexyl methacrylate, ethyl-α-hydroxymethacrylate, isobromyl methacrylate, methacrylic acid, benzyl methacrylate, phenyl methacrylate, tetrahydrofurfural methacrylate, methacrylonitrile, alpha-methylstyrene, methyl acrylate, ethyl acrylate, propyl acrylate (all isomers), butyl acrylate (all isomers), 2-ethylhexyl acrylate, isobromyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, ethacrylamide, N-methylacrylamide, N,N-dimethylacrylamide, N-tertbutylmethacrylamide, N-n-butylmethacrylamide, N-methylohnethacrylamide, N-ethylolmethacrylamide, N-tert-butylacrylamide, N-n-butylacrylamide, N-methylolacrylamide, N-ethylolacrylamide, vinylbenzoic acid (all isomers), diethylaminostyrene (all isomers), alpha-methylvinyl benzoic acid (all isomers), diethylamino alpha-methylstyrene (all isomers), p-vinylbenzene sulfonic acid, p-vinylbenzene sulfonic and sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, 3-isopropenyl-a,a-dimethylbenzyl isocyanate, N-vinylpyrrolidone, N-vinylcarbazole, butadiene, isoprene, chloroprene, ethylene and propylene.

84. The method of claim 71 wherein the substrate polymer is contacted with the monomers and control agents at a temperature of less than 90° C.

85. The method of claim 84 wherein the temperature is less than about 60° C.

86. The method of claim 84 wherein the temperature is less than about 45° C.

87. The method of claim 71 wherein the monomer is oligomeric.

88. The method of claim 71 wherein the monomer is macromeric.

89. The method of claim 71 wherein the concentration of monomer in the first and/or second solution is between about 5 volume % and 40 volume %.

90. The method of claim 71 wherein the concentration of monomer in the first and/or second is between about 10 volume % and 25 volume %.

91. The method of claim 71 wherein the concentration of monomer in the first and/or second is between about 10 volume % and 15 volume %.

92. The method of claim 71 wherein the radical-forming agent is selected from the group consisting of: exposure to particle radiation; exposure to plasma discharge radiation; exposure to ionizing radiation including γ-irradiation, electron beam radiation, X-rays; exposure to electromagnetic radiation including radiation in the UV, visible, infrared and microwave spectrum; exposure to high or low levels of temperature; and exposure to chemical agents that induce hydrogen abstraction and radical propagation.

93. The method of claim 71 wherein the radical-forming agent comprises γ-radiation.

94. A substrate polymer with a plurality of polymer grafts attached to its surface in different regions made by the method of claim 71.

95. The method of claim 1 wherein the surface of the substrate polymer is non-functionalized.

96. The method of claim 1, wherein the substrate polymer is contacted with the control agent at a temperature of less than 90° C.

97. The method of claim 1 wherein the substrate polymer is fluoropolymer.

98. The method of claim 13 wherein the surface of the substrate is non-functionalized.

99. The method of claim 13 wherein the substrate polymer is contacted with the control agents at a temperature of less than 90° C.

100. The method of claim 13 wherein the substrate is a fluoropolymer.

101. The method of claim 30 wherein the substrate is a fluoropolymer.

102. The method of claim 45 or 46 wherein the surface of the substrate polymer is non-functionalized.

103. The method of claim 45 wherein the substrate is a fluoropolymer.

104. The method of claim 45 or 46 wherein the substrate polymer is contacted with the monomer and control agent at a temperature of less than 90° C.

105. The method of claim 71 wherein the substrate is a fluoropolymer.

106. The method of claim 104 wherein the temperature is less than about 60° C.

107. The method of claim 104 wherein the temperature is less than about 45° C.

* * * * *